(12) United States Patent
Su et al.

(10) Patent No.: US 10,200,822 B2
(45) Date of Patent: Feb. 5, 2019

(54) ACTIVITY RECOGNITION SYSTEMS AND METHODS

(71) Applicant: Intertrust Technologies Corporation, Sunnyvale, CA (US)

(72) Inventors: Jiawen Su, Sunnyvale, CA (US); Yiming Ma, Fremont, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 15/976,136

(22) Filed: May 10, 2018

(65) Prior Publication Data

US 2018/0332436 A1 Nov. 15, 2018

Related U.S. Application Data

(63) Continuation of application No. 15/653,129, filed on Jul. 18, 2017, now Pat. No. 10,003,927, which is a continuation of application No. 14/072,469, filed on Nov. 5, 2013, now Pat. No. 9,736,652.

(60) Provisional application No. 61/723,233, filed on Nov. 6, 2012.

(51) Int. Cl.
*H04W 24/00* (2009.01)
*H04W 4/029* (2018.01)
*H04W 4/21* (2018.01)
*H04W 4/021* (2018.01)

(52) U.S. Cl.
CPC .......... *H04W 4/029* (2018.02); *H04W 4/021* (2013.01); *H04W 4/21* (2018.02)

(58) Field of Classification Search
CPC .......... H04W 4/23; H04W 4/38; H04W 4/30; H04W 8/18; H04W 4/021; H04W 4/02; H04W 64/00; H04L 29/08657; H04L 29/08108; H04L 29/08936
See application file for complete search history.

(56) References Cited

U.S. PATENT DOCUMENTS

| 8,234,387 | B2 | 7/2012 | Bradley et al. |
| 2002/0111154 | A1 | 8/2002 | Eldering et al. |
| 2007/0180519 | A1 | 8/2007 | Boccon-Gibod et al. |

(Continued)

FOREIGN PATENT DOCUMENTS

| KR | 10-1186443 B1 | 9/2012 |
| WO | WO 2008/082794 A2 | 7/2008 |

OTHER PUBLICATIONS

International Search Report and Written Opinion dated Feb. 20, 2014, received in related International Patent Application No. PCT/US2013/068495.

*Primary Examiner* — Moustapha Diaby
(74) *Attorney, Agent, or Firm* — Finnegan, Henderson, Farabow, Garrett & Dunner, LLP

(57) ABSTRACT

Systems and methods for recognizing and/or predicting activities of a user of a mobile device are disclosed. In certain embodiments, the systems and methods may predict a future activity and/or location of a mobile device user based on current and/or historical device data and/or other personal information relating to the user. In some embodiments, probabilistic determinations and/or other statistical models may be used to predict future activities and locations of a mobile device user. The disclosed systems and methods may further utilize location and/or activity recognition and/or prediction methods to deliver personalized services to a user of a mobile device at a particular time and/or location.

18 Claims, 12 Drawing Sheets

(56) References Cited

U.S. PATENT DOCUMENTS

| | | |
|---|---|---|
| 2008/0117202 A1 | 5/2008 | Martinez et al. |
| 2008/0125959 A1 | 5/2008 | Doherty et al. |
| 2009/0164395 A1 | 6/2009 | Heck |
| 2010/0293049 A1 | 11/2010 | Maher et al. |
| 2011/0029465 A1 | 2/2011 | Ito et al. |
| 2011/0288917 A1 | 11/2011 | Wanek et al. |
| 2011/0313956 A1 | 12/2011 | Abe et al. |
| 2012/0089605 A1 | 4/2012 | Bangalore et al. |
| 2013/0332987 A1 | 12/2013 | Tenneti et al. |
| 2014/0032468 A1 | 1/2014 | Anandaraj |

ACTIVITY RECOGNITION SYSTEMS AND METHODS

RELATED APPLICATIONS

This application is a continuation under 37 C.F.R. § 1.53(b) of Prior U.S. patent application Ser. No. 15/653,129, filed Jul. 18, 2017, which is a continuation of U.S. patent application Ser. No. 14/072,469, filed Nov. 5, 2013 (now U.S. Pat. No. 9,736,652), which claims the benefit of priority under 35 U.S.C. § 119(e) to U.S. Provisional Patent Application No. 61/723,233, filed Nov. 6, 2012, both entitled "ACTIVITY RECOGNITION SYSTEMS AND METHODS," which are hereby incorporated by reference in their entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

Mobile devices have become an important part of our lives. People often carry mobile devices wherever they go and customize devices according to their personal preferences, environment, and/or habits. Modern mobile devices typically include various types of sensors and other data input components. These sensors gather data about the environment surrounding the mobile device and/or the user of the mobile device, and may provide information regarding device location, motion, and/or other activities. A user may also utilize a mobile device in connection with a variety of applications. Monitoring such interactions may provide additional information regarding a user's activities.

Information regarding a mobile device user's activities may be utilized in a variety of contexts. For example, advertisement-based content distribution systems may be utilized to help fund the production of content, the services that distribute the content, and the devices that render the content. To maximize the benefit of ad-based content distributions systems, advertisements delivered to a consumer should ideally be well-matched to the interests of the consumer at a time and/or location that the consumer is likely to purchase advertised goods and/or services. Similarly, services that distribute offers, promotions, or other services seek to target the distribution of such materials to those individuals most likely to be interested. Identifying and/or predicting user activities may thus allow for more effective targeting of advertisements and other personalized services to the user.

Various systems and methods disclosed herein may be utilized to recognize and/or predict activity associated with a mobile device and/or a user thereof. In some embodiments, the disclosed systems and methods may recognize activities of a user of a mobile device based on sensor information and/or other data provided by the mobile device. In certain embodiments, the systems and methods may be utilized in connection with predicting a future activity and/or location of the user based on current and/or historical device data and/or other personal information relating to the user. In some embodiments, statistical Markov models and/or the like are used. Further embodiments of the systems and methods disclosed herein may utilize location and/or activity recognition and/or prediction methods to deliver personalized services to a user of a mobile device at a particular time and/or location (e.g., targeted advertising services, services that provide offers, promotions, messages, warnings, and/or the like).

In certain embodiments, a computer-implemented method may include receiving device data collected from a mobile device and determining a first set of user activities based on the device data. Based on the first set of user activities and available device data, a second set of likely future user activities may be determined.

In some embodiments, an activity recognition system is disclosed. The activity recognition system may include a transceiver and a data analyzer. The transceiver may be configured to receive device data collected by a mobile device. The device data may be indicative of one or more user activities. Exemplary user activities may include, without limitation, walking, running, driving, shopping, dining, watching television, visiting a location, traveling, listening to music, browsing the Internet, sleeping, and/or the like. The data analyzer may be further configured to determine and/or predict one or more activities of a user associated with the mobile device based on device data. The system may further include a personalized service engine configured to provision personalized services to a user based on recognized and/or predicted activities.

In certain embodiments, a mobile device is disclosed. The mobile device may include a personal agent configured to collect device data. The device data may be indicative of one or more activities of a user associated with the mobile device. Further, the device data can be utilized to determine one or more parameters related to the user. Exemplary parameters may include, without limitation, the user's name, age, home address, work address, gender, items, activities, people, places, and/or things that the user is interested in, user behavior patterns, the frequency that the user visits a place, and/or other personal attributes that may characterize the user in some manner.

In further embodiments, a method for recognizing user activities is disclosed. In some embodiments, the method may include identifying one or more first candidate places corresponding to a user associated with a mobile device based on device data collected by one or more sensors of the mobile device. A current location of the user may be determined from one or more first candidate places based on the device data and one or more user activities. A personalized service may be provided to the user based on the determination.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
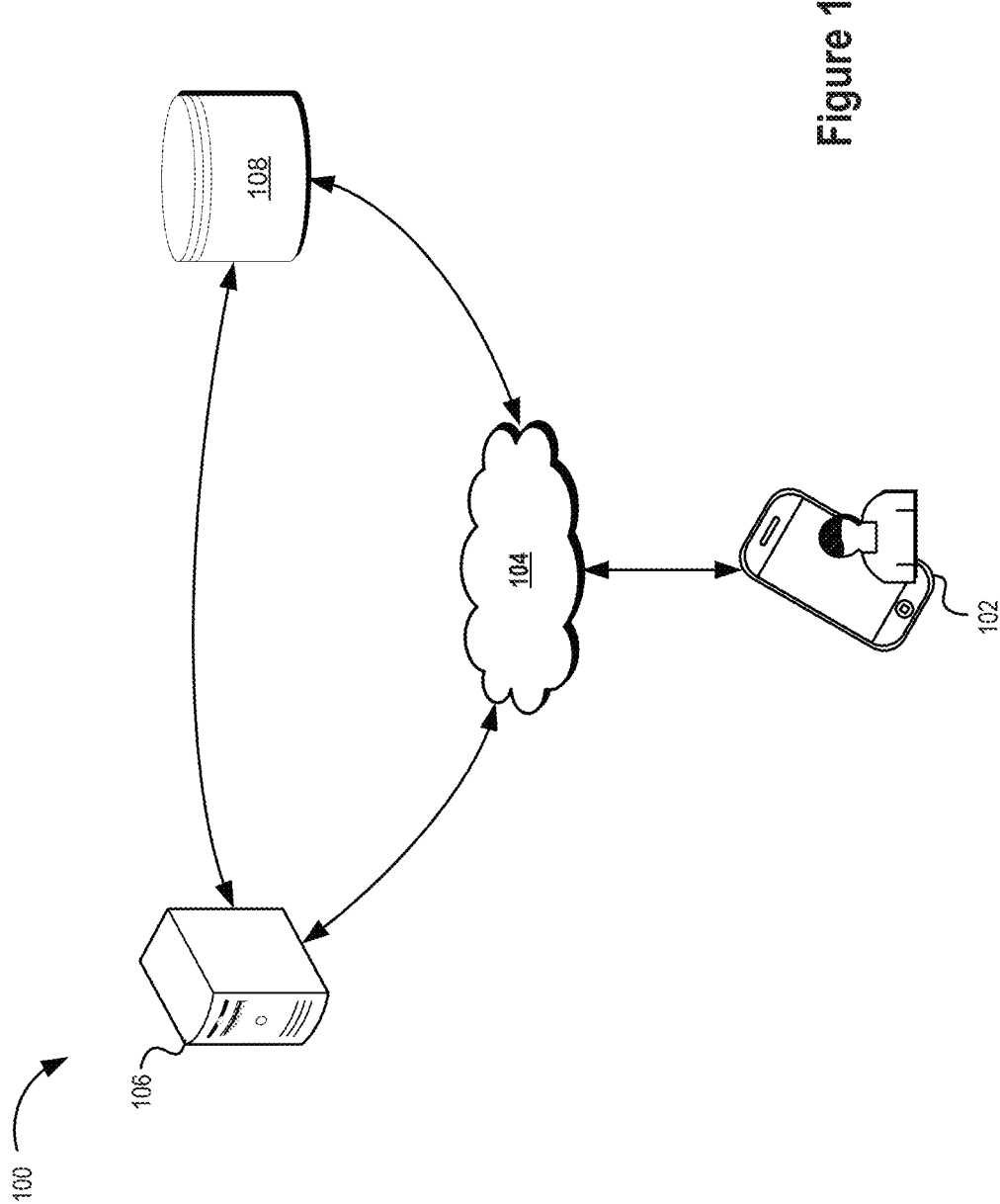
FIG. 1 illustrates an exemplary ecosystem for a mobile device consistent with embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Embodiments of the disclosure may be understood by reference to the drawings, wherein like parts may be designated by like numerals. The components of the disclosed embodiments, as generally described and illustrated in the figures herein, may be arranged and designed in a wide variety of different configurations. Thus, the following detailed description of illustrative embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Systems and methods are described for recognizing activities of a user of a mobile device based on sensor information and/or other data provided by the mobile device associated with the user. In certain embodiments, the systems and methods may be utilized in connection with predicting a future activity and/or location of the user based on current and/or historical device data and/or other personal information relating to the user. In some embodiments, statistical Markov models may be utilized in connection with predicting, among other things, future locations of a user, arrival times at such locations, and/or the like. Further embodiments of the systems and methods disclosed herein may utilize location and/or activity recognition and/or prediction methods to deliver personalized services to a user of a mobile device (e.g., targeted advertising services or the like).

In certain embodiments, the systems and methods described herein can, for example, be used in connection with digital rights management ("DRM") technologies such as that described in commonly assigned, co-pending U.S. patent application Ser. No. 11/583,693, "Digital Rights Management Engine Systems and Methods," filed Oct. 18, 2006 and published as U.S. Pub. No. 2007/0180519 A1 ("the '693 application") and/or service orchestration and DRM technologies such as those described in commonly assigned U.S. Pat. No. 8,234,387, "Interoperable Systems and Methods for Peer-to-Peer Service Orchestration" ("the '387 patent") (the contents of the '693 application and the '387 patent hereby being incorporated by reference in their entireties), as well as in other contexts. In further embodiments, the systems and methods described herein can be used in connection with personalized service technologies including, for example, information targeting technologies such as those described in commonly assigned co-pending U.S. patent application Ser. No. 12/785,406, filed May 21, 2010 ("the '406 application") and/or U.S. patent application Ser. No. 13/914,538, filed Jun. 10, 2013 ("the '538 application"), both of which are incorporated herein by reference in their entirety. It will be appreciated that these systems and methods are novel, as are many of the components, systems, and methods employed therein.

FIG. 1 illustrates an exemplary ecosystem 100 for a mobile device 102 consistent with some embodiments of the present disclosure. Although illustrated as a smartphone, the mobile device 102 may comprise a variety of computing devices and systems, including any mobile system and/or device suitable to implement the systems and methods disclosed herein. For example, mobile device 102 may comprise a laptop computer system, a wireless communication device (e.g., a cellular telephone), a smartphone, a tablet computer, a wireless control device (e.g., keyless entry or remote start devices), a gaming or other entertainment device, and/or the like. In certain embodiments, the mobile device 102 may be associated with a vehicle or other system associated with the user. For example, the mobile device 102 may comprise a telematics system, a navigational system, and/or an in-vehicle infotainment ("IVI") system which may be associated with a user's vehicle. Although FIG. 1 illustrates one mobile device 102, it will be appreciated that the disclosed embodiments are suitable for broader application, including in ecosystems that comprise a plurality of mobile devices.

The mobile device 102 may be commutatively coupled to an activity recognition system 106 and/or a database 108 via a network 104. In certain embodiments, the network 104 may comprise a variety of network communication devices and/or channels and may utilize any suitable communications protocols and/or standards facilitating communication between the mobile device 102, the activity recognition system 106, the database 108, and/or one or more other connected system or systems. The network 104 may comprise the Internet, a local area network, a virtual private network, and/or any other communication network utilizing one or more electronic communication technologies and/or standards (e.g., Ethernet or the like). In some embodiments, the network 104 may comprise a wireless carrier system such as a personal communications system ("PCS"), and/or any other suitable communication system incorporating any suitable communication standards and/or protocols. In further embodiments, the network 104 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 104 may incorporate one or more satellite communication links. In yet further embodiments, the network may utilize IEEE's 802.11 standards, Bluetooth®, ultra-wide band ("UWB"), Zigbee®, and/or any other suitable standard or standards.

The mobile device 102, activity recognition system 106 and/or database 108 may comprise any suitable computing system or systems configured to implement embodiments of the systems and methods disclosed herein. In certain embodiments, the mobile device 102, activity recognition system 106 and/or database 108 may comprise at least one processor system configured to execute instructions stored on an associated non-transitory computer-readable storage medium. As discussed in more detail below, the mobile device 102, activity recognition system 106 and/or database 108 may further comprise a secure processing unit ("SPU") configured to perform sensitive operations such as trusted credential and/or key management, secure policy management, and/or other aspects of the systems and methods disclosed herein. The mobile device 102, activity recognition system 106 and/or database 108 may further comprise software and/or hardware configured to enable electronic communication of information between the devices and/or systems 102, 106, 108 via network 104.

The mobile device 102 may be configured to collect device data relating to the mobile device 102 and/or an associated user. In certain embodiments, the mobile device 102 may utilize one or more associated sensor systems configured to measure data that may be utilized as and/or used to determine personal information relating to a user of the device 104. For example, the mobile device 102 may include, without limitation, one or more accelerometers, Global Positioning System ("GPS") sensors, acoustic sensors, infrared sensors, temperature sensors, imaging sensors, gyroscopes, proximity sensors, light sensors, magnetometers, cameras, wireless communication systems, and/or any other suitable system and/or sensors for detecting and/or measuring information associated with the mobile device 102, its surroundings, and/or a user of the device 102. Certain sensors of mobile device 102 may be location-based sensors configured to generate personal information relating to a location of the mobile device 102 and/or an associated user. Further sensors may be activity-based and/or other environmental sensors configured to provide information relating to a usage of the mobile device 102 (e.g., application usage information or the like) and/or an environment proximate to the mobile device 102. In certain embodiments, the one or more sensors of the device 102 may measure contextual information that may be used to determine and/or infer certain personal information relating to the user (e.g., interests, regularly visited points of interest, etc.). For example, if an accelerometer of device 102 indicates that the device 102 does not move on average between 11:00 PM and 6:00 AM every day, it may be inferred that the user typically sleeps between these hours.

Personal information and/or other device data collected by the mobile device 102 may be stored by the mobile device 102 and/or communicated to the activity recognition system 106 and/or database 108 for storage. In certain embodiments, the activity recognition system 106 may comprise a computing system configured to extract and/or analyze data (e.g., received device data). In some embodiments, the activity recognition system 106 may implement one or more analytic tools and/or one or more applications that enable the activity recognition system 106 to recognize and/or predict one or more user activities based on received personal information and/or other device data (e.g., information and data stored in database 108). In further embodiments, the activity recognition system 106 may further implement one or more analytic tools and/or applications to identify one or more parameters relating to a user, which may include personal information relating to the user, based on device data received from mobile device 102. Although, for ease of explanation, activity recognition system 106 and database 108 are shown separately from device 102, it will be appreciated that in some embodiments some or all of the functionality of some or all of these systems could be combined or rearranged. For example, some or all of the activities described herein as being performed by the activity recognition system 106 could be performed by mobile device 102 (e.g., aspects of the activity recognition system 106 could effectively be incorporated into the mobile device 102).

In certain embodiments, the activity recognition system 106 may be configured to access database 108 and extract data from the database 108 using any suitable method. For example, the activity recognition system 106 may query the database 108 using a variety of database languages including, for example, Structured Query Language ("SQL"), 4D Query Language, Object Query Language, Stack Based Query Language ("SBQL"), and/or any other suitable mechanism. Although illustrated as a single system, it will be appreciated that the activity recognition system 106 may be implemented using a plurality of computing devices configured to jointly perform certain functions of the activity recognition system 106.

The activity recognition system 106 may be associated with a service provider. For example, the activity recognition system 106 may be associated with an advertising service provider, a data collection service provider, a statistic service provider, and/or the like. In some embodiments, the activity recognition system 106 may provide subscription-based services to users of the mobile device 102. For example, the activity recognition system 106 may provide location-based services (e.g., geographic mapping services or the like) to the user of the mobile device 102 on a subscription basis. In further embodiments, services provided by the activity recognition system 106 may be provided in exchange for device data collected by the mobile device 102. For example, targeted advertising services provided by the activity recognition system 106 may be provided in exchange for a user sharing personal information collected by the mobile device 102 with the targeted advertising service provider.

As discussed above, personal information and/or other device data collected by the mobile device 102 may be communicated to the database 108 for storage. In certain embodiments, the database 108 may operate as a centralized repository of device data and/or other personal information collected by the mobile device 102. Although illustrated as a discrete database (e.g., associated with a discrete system), in other embodiments the database 108 may be included in and/or distributed between the mobile device 102 and the activity recognition system 106. The database 108 may be implemented using any suitable technology including, without limitation, MySQL® and/or Microsoft SQL®, and may store data in any suitable format or formats. It will further be appreciated that although, for ease of explanation, FIG. 1 illustrates a single mobile device 102 interacting with activity recognition system 106 and database 108, in practice, activity recognition system 106 and/or database 108 may interact with, and/or provide services for, multiple mobile devices.

It will be appreciated that a number of variations can be made to the architecture and relationships presented in connection with FIG. 1 within the scope of the inventive body of work. For example, certain system functionalities described above (e.g., functionalities of mobile device 102, activity recognition system 106, and/or database 108) may be integrated into a single system and/or any suitable combination of systems in any suitable configuration. Thus it will be appreciated that the architecture of FIG. 1 is provided for purposes of illustration and explanation, and not limitation.

Figure 2:
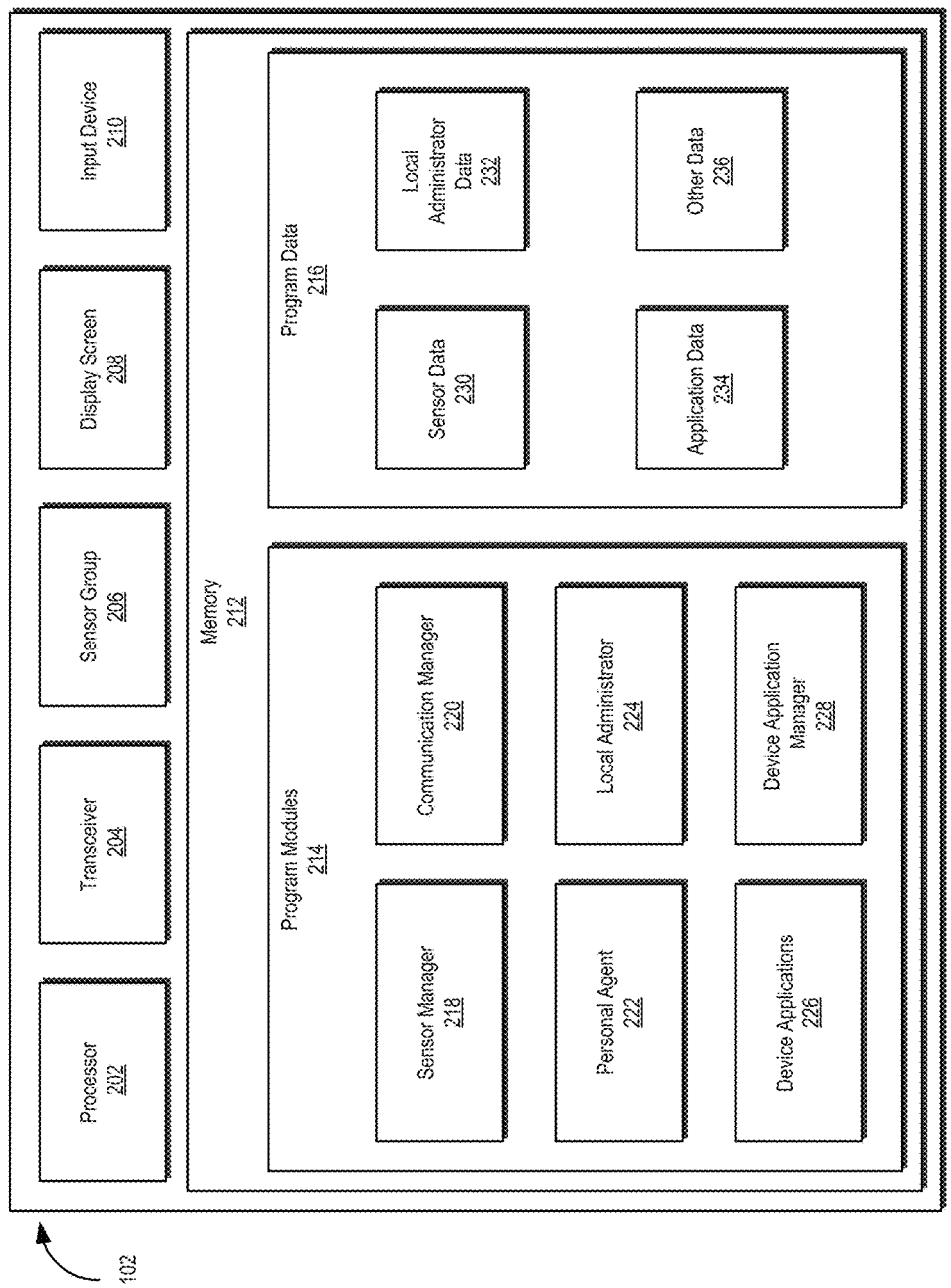
FIG. 2 illustrates a block diagram of a mobile device consistent with embodiments of the present disclosure.

FIG. 2 illustrates a block diagram of a mobile device 102 consistent with embodiments of the present disclosure. The mobile device 102 may be embodied by a variety of computing devices and systems, including any system and/or device suitable to implement some or all of the systems and methods disclosed herein. Aspects of the mobile device 102 illustrated in and described below in connection with FIG. 2 may be implemented in a variety of ways, including using software, firmware, hardware, and/or any combination thereof.

The mobile device 102 may include, without limitation, one or more processors 202, transceivers 204, sensors 206, display screens 208, input devices 210 and/or memory devices 212. The one or more sensors 206 may include, without limitation, one or more accelerometers, GPS sensors (e.g., assisted GPS ("A-GPS") sensors), acoustic sensors, infrared sensors, temperature sensors, imaging sensors, gyroscopes, proximity sensors, light sensors, magnetometers, cameras, wireless communication systems, and/or any other suitable system and/or sensor for detecting and/or measuring data associated with the device 102 and/or its surroundings. Sensors 206 may be implemented using any suitable technology or technologies including, without limitation, VLSI video, optical gyros, Micro-Electro Mechanical Systems ("MEMS"), and/or the like. The one or more sensors 206 may be configured to measure device data associated with the device 102 and/or a user of the device 102. It will be appreciated that there are a variety of devices, systems, and/or sensors that may be utilized to implement embodiments of the systems and methods disclosed herein, and that any suitable devices, systems, and/or sensors may be used in connection with the disclosed embodiments.

As users interact with devices and/or services, device data, including personal information related to the user, may be obtained. In certain embodiments, this data may reflect in part the interests and/or behavior patterns of the user, and may be utilized in connection with location and/or activity recognition and/or prediction methods consistent with embodiments disclosed herein. Device data may be provided by a user and/or be generated based on the user's activities. Device data measured by sensors 206 may indicative of one or more states associated with the mobile device 102, one or more activities of a user of the mobile device 102, and/or any other parameter or personal information relating to a user of the mobile device 102. Exemplary data measured by sensors 206 may include, without limitation, information relating to a location of the mobile device 102 and/or changes in the location of the mobile device 102, an orientation of the mobile device 102, information associated with sounds proximate to the mobile device 102, a measured duration of the mobile device 102 being located in a particular location, a speed and/or moving direction of the mobile device 102, sound and/or light conditions proximate to the mobile device 102, proximity of the mobile device 102 to one or more objects and/or locations, and/or any other information relating to the mobile device 102, its environment, and/or a mobile device user.

Device data collected by the mobile device 102 and/or sensors 206 included therein may comprise information regarding a user's interactions with the device 102. In certain embodiments, such data may comprise information provided directly by a user of the device 102. For example, device data may comprise information provided by a user including, without limitation, personal identification information including age, gender, and/or the like and content preference or other interest based information including preferred genres, artists, and/or the like.

In further embodiments, device data may comprise information passively collected from a user's interactions with the device 102. For example, device data may comprise information relating to a user's activities with one or more applications executing on the device 102, location-based user behavior, and/or the like. In certain embodiments, device data may comprise metadata associated with one or more applications 226 installed on the mobile device 102 such as, for example, a web browser application, a gaming application, a music application, a social networking application, an email application, and/or the like. For example, device data may comprise metadata associated with one or more websites viewed by a user of the mobile device 102 using a web browser application. In another example, device data may comprise metadata associated with use of a social networking application utilized by the user on the mobile device 102.

In some embodiments, device data may be gathered, managed, maintained, and/or stored locally on the mobile device 102. In further embodiments, device data may be gathered, managed, maintained, and/or stored by a remote trusted third party (e.g., a third party associated with an activity recognition system). In certain embodiments, device data may be shared and/or aggregated between systems and devices to build a profile relating to a user of the mobile device 102.

The mobile device 102 may include one or more processors 202. Processor 202 may comprise, for example, a microprocessor, a microcontroller, logic circuitry, an applications processor, a baseband processor, an x86 processor, an RISC processor, an ASIC processor, a CSIC processor, an ARM processor, and/or any other suitable type of processor utilizing any suitable processor architecture or technology. Processor 202 may be configured to execute instructions stored by memory 212 to perform certain methods disclosed herein. In some embodiments, mobile device 102 may further comprise an SPU (not shown) configured to perform sensitive operations such as trusted credential and/or key management, secure policy management, and/or other secure processes and/or methods.

A transceiver 204 of the mobile device 102 may be configured to transmit and/or receive data via a network from one or more communicatively coupled devices, systems, and/or service providers utilizing any suitable communication protocol or protocols. For example, the transceiver 204 may enable the mobile device 102 to transmit collected device data to an activity recognition system and/or a database implementing a third party service. Similarly, the transceiver 204 may allow the mobile device 102 to receive various data, information, and/or applications for processing by processor 202 and/or storage by memory 212. The device 102 may further comprise software configured to enable electronic communication of information to/from the device 102 via the transceiver 204 using any suitable communication technology and/or standard. In some embodiments, a separate receiver and transmitter may be used instead of an integrated transceiver.

The mobile device 102 may include one or more components that may facilitate user interaction with the device 102. For example, the mobile device 102 may comprise a display screen 208 and/or an input device 210. The display screen 208 may be configured to display a graphical user interface to a user of the mobile device 102 facilitating interaction with the device 102. The display screen 208 may utilize any suitable screen or display technology including, without limitation, cathode ray tube ("CRT") technology, liquid crystal display ("LCD") technology, light emitting diode ("LED") based technology, organic LED technology, electrophoretic display technology, and/or the like. In some embodiments, the display screen 208 may comprise a touch screen configured to receive input from a user of the mobile device 102.

The input device 210 may comprise any suitable device allowing a user to interact with the mobile device 102 and/or input information into the device 102. In certain embodiments, the input device 210 may comprise, without limitation, a touch component of a touch screen display, a keyboard, a stylus, a pointing device (e.g., a trackpad, a mouse, etc.), a combination of some or all of the foregoing, and/or any other suitable input device.

Memory 212 may be configured to store data, instructions and/or modules for use and/or execution by the processor 202. In certain embodiments, the memory 212 may comprise a non-transitory computer-readable storage medium. The memory 212 may implement any suitable memory technology or technologies including, without limitation, random access memory ("RAM"), read only memory ("ROM"), hard disk drives ("HDD"), secure digital ("SD") card, floppy disks, magnetic tapes, optical disc drives, flash memory, and/or the like. In some embodiments, the memory 212 may include a program module partition 214 and a program data partition 216.

The program module partition 214 may include a set of instructions that can be executed by the processor 202 to perform specific actions on the device 102. As described in more detail below, the program module partition 214 may include, among other things, a sensor manager 218, a communication manager 220, a personal agent 222, a location administrator 224, other device applications 226, and a device application manager 228. The program data partition 216 may include, without limitation, sensor data 230, local administrator data 232, application data 234, and/or other data 236. Certain information stored in the program data partition 216 including, for example, sensor data 230, application data 234, and/or other data 236 may be referred to herein as device data.

The sensor manager 218 may be configured to manage the operation of one or more sensors in the sensor group 206. In some embodiments, the sensor manager 218 may manage a polling rate associated with one or more sensors in the sensor group 206 (e.g., a rate at which the one or more sensors 206 measure data associated with the mobile device 102) based on various factors including, for example, a battery level of the mobile device 102, a signal strength of the mobile device 102, and/or a state of the mobile device 102. The sensor manager 218 may further store device data measured by the sensor group 206 as sensor data 230 in the program data partition 216 of memory 212. In certain embodiments, the sensor manager 218 may include drivers for one or more sensors in the sensor group 206.

The communication manager 220 may be configured to manage communication to and/or from the mobile device 102 via the transceiver 204. For example, the communication manager 220 may manage communications between the mobile device 102 and an activity recognition system, an external database, and/or any other system or systems in communication with the mobile device 102 (e.g., systems associated with a third party service provider or the like). In certain embodiments, the communication manager 220 may be configured to manage a time interval at which device data including, for example, sensor data 230, is transmitted from the mobile device 102 to one or more external systems (e.g., a web analytic service, an external database, and/or the like). For example, the communication manager 220 may be configured to shorten and/or lengthen a periodic interval at which device data is transferred from the mobile device 102 based on a rate at which device data is collected by the device 102.

Personal information may be collected, stored, maintained, and/or managed by a personal agent 222, such as that described in the '406 application and/or '538 application, operating locally on a user's device 102. In further embodiments, the personal agent 222 may operate on a trusted remote system such as an activity recognition system and/or another trusted service provider system. The personal agent 222 may be implemented as an agent that runs locally on the device 102 (e.g., as a background service) configured to monitor events and collect information and/or device data from a variety of sources including, for example, direct user input, user actions, device contents, device sensors 206, web browsing and/or searches, and/or the like. For example, in some embodiments, the personal agent 222 may be configured to collect device data associated with the device 102 and/or a user thereof by collecting data associated with a user's interaction with one or more applications 226 executing on the device (e.g., social networking applications, web browsing applications, etc.). In further embodiments, the personal agent 222 may be implemented as a network service that interacts with services (e.g., social networks and/or the like) and collects information related to a user profile, friends, groups, recommendations, and/or the like.

In some embodiments, a user of the mobile device 102 may define one or more policies or other rules that govern how device data can be collected and/or utilized (e.g., utilized by a third party or the like). Such policies or rules can be articulated and implemented using any suitable mechanism including, for example, using the digital rights management techniques described in the '387 patent and/or the '693 application. In certain embodiments, rights, rules, and/or policies associated with device data may be managed and/or enforced using the personal agent 222 and/or a local administrator 224 executing on the device 102. For example, in some embodiments, a user may classify certain sensor data 230 and/or other device data 236 under one or more categories (e.g., confidential, public, etc.). Based on the categories, the user of the mobile device 102 may define sharing policies that control sharing of the sensor data 230 and/or other device data 236 by the device 102. The user of the mobile device 102 may further define usage policies configured to manage usage of device data shared by the device enforceable on one or more external systems (e.g., an activity recognition system and/or an external database system). In certain embodiments, rights, rules, and/or policies associated with the device data may be stored by the device 102 as local administrative data 232.

The program modules 214 may further include one or more other device applications 226 that may operate on the mobile device 102. Exemplary device applications 226 include, without limitation, web browsing applications, communication applications (e.g., e-mail or text applications), gaming applications, music and/or other multi-media applications, social networking applications, and/or the like. As discussed above, device data may be collected based on a user's interactions with the device 102. For example, metadata associated with a web browsing application may be collected as device data. Such device data may be stored as application data 234.

A variety of other device data 236 may be stored in the program data 216 for use in connection with the systems and methods disclosed herein. For example, information relating to user contacts, communication messages, and/or other information stored by a user of the mobile device 102 in memory 212 may be stored as other device data 236 for use in connection with location and/or activity recognition and/or prediction methods consistent with embodiments disclosed herein.

The device application manager 228 may be configured to manage the execution of the personal agent 222 and/or other device applications 226 and/or modules of the mobile device 102. In certain embodiments, the device application manager 228 may provide instructions to one or more program modules to execute commands and/or coordinate interactions with the user (e.g., via user input 210 and/or display 208). In some embodiments, the device application manager 228 may allocate certain device resources to executing program modules. For example, the device application manager 228 may allocate memory space, processing power, display availability, and/or any other device resource to one or more program modules executing on the mobile device 102 (e.g., personal agent 222, device applications 226, etc.).

It will be appreciated that a mobile device 102 consistent with embodiments disclosed herein may exclude some of the illustrated elements and/or include a variety of additional elements and/or facilitate other functions. Certain elements and/or modules of the illustrated mobile device 102 may also be combined into one or more elements and/or modules capable of performing the functions of the constituent blocks. Thus it will be appreciated that the architecture of the mobile device 102 illustrated in FIG. 2 is provided for purposes of illustration and explanation, and not limitation.

Figure 3:
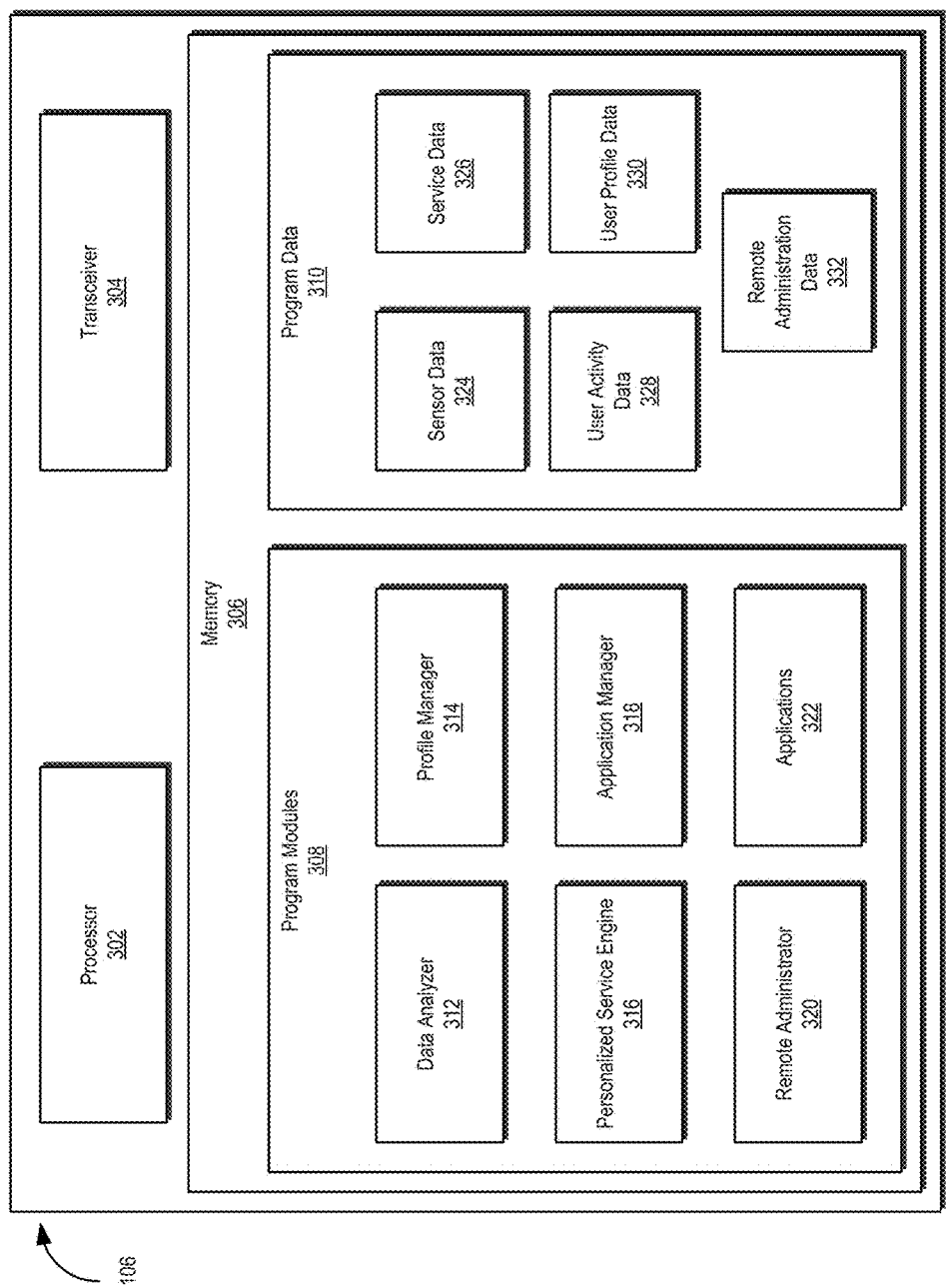
FIG. 3 illustrates a block diagram of an activity recognition system consistent with embodiments of the present disclosure.

FIG. 3 illustrates a block diagram of an activity recognition system 106 consistent with embodiments of the present disclosure. The activity recognition system 106 may be embodied by a variety of computing devices and systems, including any mobile system and/or device suitable to implement the systems and methods disclosed herein. Aspects of the activity recognition system 106 illustrated in and described below in connection with FIG. 3 may be implemented in a variety of ways, including using software, firmware, hardware, and/or any combination thereof.

The activity recognition system 106 may include, without limitation, one or more processors 302, transceivers 304, and/or memory devices 306. The processor 302 may comprise any suitable processing device implementing any suitable processing architectures or technologies, including any processing architecture or technology described herein. The processor 302 may be configured to execute instructions stored by the memory 306 to perform certain methods disclosed herein. In some embodiments, the system 106 may further include a SPU (not shown) configured to perform sensitive operations such as trusted credential and/or key management, secure policy management, and/or other secure processes and/or methods.

The transceiver 304 of the activity recognition system 106 may be configured to receive data via a network from one or more communicatively coupled devices, systems, and/or service providers utilizing any suitable communication protocol or protocols. For example, the transceiver 304 may enable the activity recognition system 106 to transmit and/or receive data (e.g., device data) from a communicatively coupled mobile device, a database, and/or a service provider implementing a third party service. Similarly, the transceiver 304 may allow the activity recognition system 106 to receive various data, information, and/or applications for processing by processor 302 and/or storage by memory 306. The activity recognition system 106 may further comprise software configured to enable electronic communication of information to/from the device 102 via the transceiver 304 using any suitable communication technology and/or standard. In some embodiments, a separate receiver and transmitter may be used instead of an integrated transceiver.

Memory 306 may be configured to store data, instructions and/or modules for use and/or execution by the processor 302. In certain embodiments, the memory 306 may comprise a non-transitory computer-readable storage medium implemented using any suitable technology or technologies, including any storage technology described herein. As illustrated, in some embodiments, the memory 306 may include a program module partition 308 and a program data partition 310.

The program module partition 308 may include a set of instructions that can be executed by the processor 302 to perform specific actions on the activity recognition system 106. As described in more detail below, the program module partition 308 may include, among other things, a data analyzer 312, a profile manager 314, a personalized service engine 316, an application manager 318, a remote administrator 320, and/or one or more applications 322. The program data partition 310 may include, without limitation, sensor data 324, service data 326, activity data 328, user profile data 330, and/or remote administration data 332. Certain information stored in the program data partition 310 may be referred to herein as device data including, without limitation, sensor data 324, service data 326, activity data 328, and/or user profile data 330. In certain embodiments, data stored in the program data partition 310 may be utilized in connection with recognizing and/or predicting activities associated with a mobile device and/or a user thereof.

The sensor data 324 may comprise information collected by one or more sensors of a mobile device associated with a user and may, for example, include any of the types of sensor data described above. Service data 326 may comprise information generated from a user's interaction with one or more services. Activity data 328 may comprise information generated from a user's activities in connection with a mobile device (e.g., a user's activities using one or more applications executing on the device). User profile data 330 may comprise personal information and/or other usage data managed as part of a profile associated with a user. A variety of other types of device data may be stored in the program data partition 310 and be used in connection with the activity recognition and/or prediction systems and methods disclosed herein.

The data analyzer 312 may be configured to analyze device data (e.g., sensor data 324, service data 326, activity data 328, and/or user profile data 330) received by the activity recognition system 106 to, among other things, recognize and/or predict activity associated with a mobile device and/or a user thereof associated with the device data. In this context, the data analyzer 312 may utilize a variety of techniques including, without limitation, data mining techniques, statistical analysis techniques, predictive analysis techniques, data modeling techniques, machine-learning algorithms, and/or the like.

In certain embodiments, the data analyzer 312 may determine a first set of activities based on available device data and/or a subset thereof. The first set of activities may include a single activity and/or a plurality of activities, and may reflect one or more likely activities of a user of a mobile device as indicated by the available device data. The first set of activities may be determined in a variety of ways. In certain embodiments, the first set of activities may be determined directly from available device data. For example, device data comprising a user input or indication regarding a current activity may be utilized to directly determine an associated first set of activities.

In further embodiments, the first set of activities may be determined indirectly and/or inferred from available device data. In some embodiments, location and/or orientation-based device data may provide contextual information that may be used to determine and/or infer a likely set of activities reflected in the first set of activities. For example, based on device data that includes location information indicating that a user is in a movie theater and orientation information indicating that the device is located in the user's pocket, it may be inferred from such device data that the user is watching a movie. Accordingly, a first set of identified activities may include an activity associated with the user watching a movie.

Similarly, the first set of activities may be determined based on inferences drawn from device data associating a user's interactions with and/or activities using a mobile device. For example, a user may indicate via an application of the device (e.g., a social networking application) an indication of their location and/or an activity being performed using the device (e.g., "at the office", "going to the movie", "playing a game", etc.), and a user activity may be inferred based on such an indication. Similarly, a user may indicate in a calendar or scheduling application on the mobile device that they will be travelling on an airplane and/or on a certain flight for a certain period of time. Based on such information, a plane traveling activity or the like may be included in the first set of determined activities. It will be appreciated that a wide variety of inferences may be drawn based on a wide variety of device data, and that any suitable method, algorithm, and/or architecture for drawing such inferences to determine user activities and/or micro-activities may be utilized in connection with the embodiments disclosed herein.

In certain embodiments, the first set of activities may be determined based on one or more micro-activities. The one or more micro-activities may represent likely activities of a user determined based on available device data. In some embodiments, the one or more micro-activities may comprise activities of relatively small duration. The one or more micro-activities may be determined using methods similar to the methods used to identify the first set of activities detailed above. In some embodiments, the first set of activities may be determined from one or more identified micro-activities. For example, the first set of activities may be determined based on a combination of two or more micro-activities being identified. In further embodiments, the first set of activities may be determined based on a sequence of micro-activities occurring.

The data analyzer 312 may be configured to determine a second set of activities based, at least in part, on the first set of user activities. The second set of user activities may comprise a single activity and/or a plurality of activities, and may reflect one or more likely and/or predicted future activities of a user of a mobile device as indicated by the available device data and/or based on the first set of user activities. In some embodiments, such activities may include visiting a particular location. The second set of activities may be determined in a variety of ways, including using any of the methods described above in connection with determining the first set of activities (e.g., directly from available device data and/or the first set of activities and/or based on one or more inferences derived from available device data and/or the first set of activities).

In certain embodiments, the second set of activities may be determined by the data analyzer 312 by identifying a probability of one or more subsequent activities occurring following the identified first set of activities. The probability of one or more subsequent activities may be determined based on available device data, the identified first set of activities, and/or any information that may be utilized in predicting a future set of activities following the first set of activities. For example, if device data comprising historical data regarding device location information indicates that 90% of the time after a user is engaged in an activity of the first set of activities the user travels to a particular location, travelling to the particular location may be determined as a likely future activity of the user and be included in the second set of activities. In another example, if the first set of activates includes an activity associated with a first location and device data indicates the mobile device is traveling in a particular direction from the first location, the determined second set of activities may include an activity associated with a likely second location determined based, at least in part, on the direction of travel.

In some embodiments, probabilities of one or more subsequent activities occurring following the first set of activities may be based, at least in part, on data relating one or more other users. In certain embodiments, the one or more other users may be users having similar interests and/or user profiles to the user of a mobile device. For example, if historical spatial (i.e., location) and/or temporal information relating to other similar users indicates that 85% present of the time after a user is engaged in an activity of a first set of activities the user travels to a particular location, travelling to the particular location may be determined as likely future activity of the user and be included in the second set of activities. By utilizing information associated with other similar users, determination of the second set of activities may be improved, especially if relatively limited information and/or device data is available relating to a user of a mobile device.

As discussed above, in some embodiments, the second set of activities may be associated with one or more locations. In further embodiments, the second set of activities may be associated with one or more entities and/or user activities. Similarly, the first set of activities may be associated with one or more locations, entities, and/or activities. For example, based on available location-based sensor data 324, it may be determined that a user of a mobile device is located at or near a particular location. Accordingly, at least one activity of the first set of activities may be associated with the location.

Locations associated with activities of the first and/or second set of activities may be identified using any suitable technique including, without limitation, techniques using GPS information, geographical mapping information, and point-of-interest mapping information (e.g., data regarding a type of business or other place associated with a geographical location or locations). For example, GPS sensor information included in sensor data 324 may indicate a geographical location of a mobile device, and point-of-interest information may be used to identify one or more point-of-interests (e.g., restaurants, stores, theaters, offices, homes, markets, airports, railway stations, bus stops, parks, etc.) associated with the geographical location. In certain circumstances, geographical information may be associated with a plurality of points-of-interest, and a particular location and/or point-of-interest may be identified based on other available device data providing contextual information relating to a likely location and/or point-of-interest being visited by the user. For example, geographical information may indicate that a mobile device is located proximate to a Mediterranean restaurant and a bookstore, but may not have sufficient resolution to identify with specificity whether the user is located at the restaurant or the bookstore. If user interest information included in available device data indicates the user likes Mediterranean food, the restaurant may be identified as a likely location of the user and/or mobile device.

A profile manager 314 may be configured to generate and/or manage a user profile 330 comprising device data and/or other personal information associated with particular user. In certain embodiments, the user profile 330 may comprise device data aggregated and/or shared between systems, devices, and/or services associated with the user. In certain embodiments, the profile manager 314 may implement a personal agent, such as that described in the b application or '538 application, in connection with managing the user profile 330.

The personalized service engine 316 may be configured to provide one or more personalized services to a mobile device and/or a user thereof based, at least in part, on available device data and/or one or more identified first and/or second sets of activities. The personalized services facilitated by the personalized service engine 316 may include, without limitation, targeted advertising services, offer and/or deal services, health care services, and/or recommendation services (e.g., service recommendations, content recommendations, product recommendations, etc.). For example, a personalized service may transmit an advertisement to a user's mobile device based on a determination that the user is likely travelling to a particular location identified in the second set of activities. By transmitting an advertisement to the user's mobile device at a time the user is likely traveling to a particular point-of-interest associated with the advertisement, the likelihood of the user experiencing a positive advertisement impression may be increased. In certain embodiments, information generated in connection with providing personalized services may be stored as service data 326.

The program modules 308 may further include one or more applications 322 that may operate on the activity recognition system 106 and/or implement services provided by the system 106. Exemplary applications 322 include, without limitation, personalized service applications, registering applications, report generating applications, communication applications, operating systems, quantitative and/or qualitative analytics tools, user analytics applications, and/or any other suitable application or applications.

In some embodiments, a remote administrator 320 may be utilized to enable a user to manage usage rights articulated in remote administration data 332 associated with collected device data. In certain embodiments, such usage rights may define one or more policies or other rules that govern how device data can be collected and/or utilized (e.g., utilized by a third party or the like). Such policies or rules can be articulated and implemented using any suitable mechanism including, for example, using the digital rights management techniques described in the '387 patent and/or the '693 application. In certain embodiments, rights, rules, and/or policies associated with device data may be managed and/or enforced using a personal agent and/or the remote administrator 320. In certain embodiments, the remote administrator 320 may operate in conjunction with a local administrator operating on a mobile device in connection with usage rights and/or policy management and/or enforcement.

The application manager 318 may be configured to manage the execution of applications on the activity recognition system 106. In certain embodiments, the application manager 318 may provide instructions to one or more program modules to execute commands and/or coordinate interactions with the user. In some embodiments, the application manager 318 may allocate certain device resources to executing program modules. For example, the application manager 318 may allocate memory space, processing power, display availability, and/or any other device resource to one or more program modules executing on the activity recognition system 106.

It will be appreciated that an activity recognition system 106 consistent with embodiments disclosed herein may exclude some of the illustrated elements and/or include a variety of additional elements and/or facilitate other functions. Certain elements and/or modules of the illustrated activity recognition system 106 may also be combined into one or more elements and/or modules capable of performing the functions of the constituent blocks. Thus it will be appreciated that the architecture of the activity recognition system 106 illustrated in FIG. 3 is provided for purposes of illustration and explanation, and not limitation.

Figure 4:
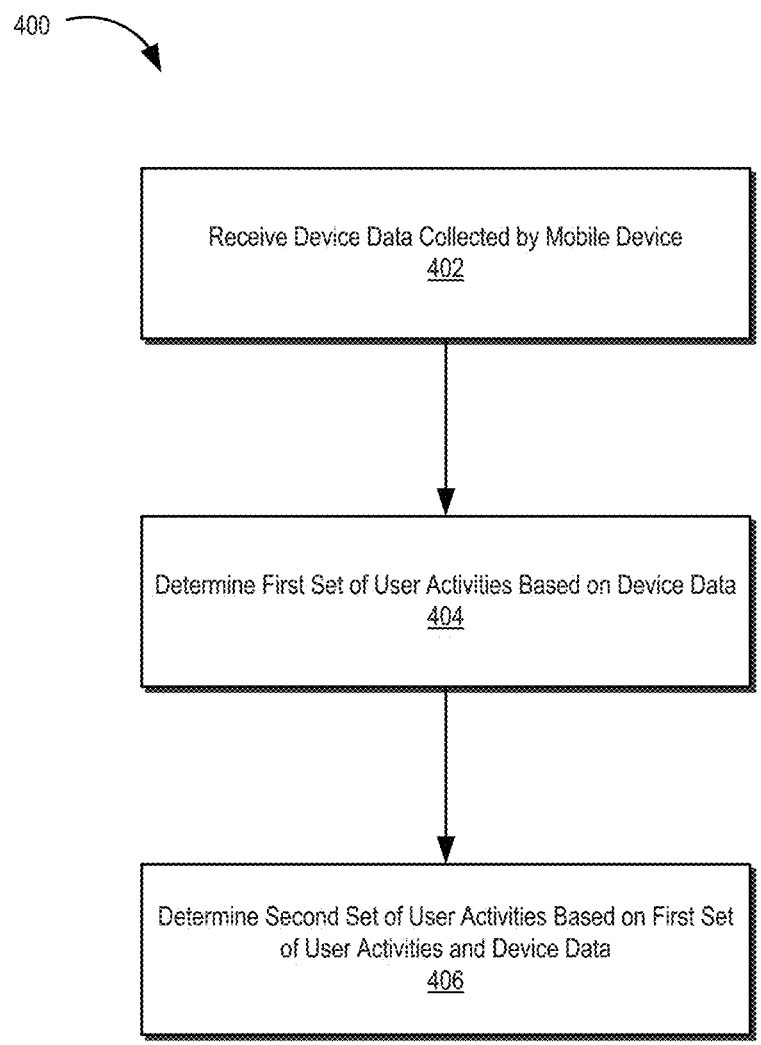
FIG. 4 illustrates a flow chart of an exemplary method for recognizing user activities consistent with embodiments of the present disclosure.

FIG. 4 illustrates a flow chart of an exemplary method 400 for recognizing user activities consistent with embodiments of the present disclosure. In certain embodiments, the illustrated method 400 and/or its constituent steps may be performed by a mobile device associated with a user, an activity recognition system, and/or any other suitable system or combination of systems.

At 402, device data may be received. The device data may comprise a variety of data regarding a user of a mobile device, and may include any of the types of device data disclosed herein (e.g., sensor data, usage data, profile data, user-provided data, personal information, etc.). In certain embodiments, the device data may be received from a mobile device and/or one or more sensors and/or systems included therein, received from an external database, received from one or more services that a user of the mobile device interacts with (e.g., a trusted third party or the like), and/or received from any other suitable source. In some embodiments, the device data may be associated with a profile associated with a user of the mobile device.

The device data may be received from a mobile device that is registered with a system implementing certain aspects of method 400 (e.g., an activity recognition system or the like). In certain embodiments, a registration process may be performed to initially associate the mobile device with an activity recognition system implementing activity recognition and/or prediction services and related personalized services disclosed herein (e.g., targeted advertising services or the like). As part of the registration process, an activity recognition system may transmit (or provide an option to download) a software module configured to manage and collect device data for use in connection with activity recognition and/or prediction services. For example, in certain embodiments, the activity recognition system may transmit a software module implementing a personal agent for execution by a mobile device in connection with a registration process. The personal agent may manage the collection and distribution of device data by the mobile device in connection with the services of the activity recognition system.

At 404, a first set of user activities may be determined based on available device data transmitted or detected at 402, or a subset thereof. The first set of activities may include a single activity and/or a plurality of activities, and may reflect one or more likely activities a user of a mobile device is likely engaged in as indicated by the available device data. In certain embodiments, the first set of activities may be determined directly from available device data or may be determined indirectly and/or inferred from available device data (e.g., by utilizing contextual information that may be utilized to determine and/or infer a likely set of activities that a user is engaged in).

In certain embodiments, the first set of activities may be determined based on one or more micro-activities. The one or more micro-activities may represent likely activities of a user determined based on available device data. In some embodiments, the one or more micro-activities may comprise activities of relatively small duration. The one or more micro-activities may be determined using methods similar to the methods used to determine one or more first set of activities detailed above. In some embodiments, the first set of activities may be determined from one or more identified micro-activities. For example, the first set of activities may be determined based on a combination of two or more micro-activities being identified. In further embodiments, the first set of activities may be determined based on a sequence of micro-activities occurring.

As an example, if device data relating to a relative speed of travel of a mobile device indicates the device is travelling at 65 miles-per-hour (i.e., a first micro-activity) and additional device data indicates the device is located on or near a freeway (i.e., a second micro-activity), the first set of activities may include an activity corresponding to travelling in a vehicle along the freeway. In another example, if device data relating to ambient light conditions of a mobile device indicates the device is in a dark space and additional device data indicates the device is located in a theater, the first set of activities may include watching a movie with the mobile device in a darkened area (e.g., in a user's pocket or the like). In yet another example, if device data indicates the device is travelling at a speed greater than 10 mph and device data relating to ambient environmental sounds proximate to the device records the sound of a train whistle, the first set of activities may include riding on a train or traveling near a train station. It will be appreciated that a wide variety of inferences may be drawn based on a wide variety of device data to determine user activities, and that any suitable method, algorithm, and/or architecture for drawing such inferences to determine user activities and/or micro-activities may be utilized in connection with the embodiments disclosed herein.

The first set of user activities may be updated as new device data becomes available. In some embodiments, such updating may occur at periodic intervals (e.g., every 5 minutes or the like). In further embodiments, such updating may occur whenever new device data is received that may change the one or more activities identified in the first set of user activities (i.e., change the determination made at 404). For example, if updated device data indicates that a location associated with a mobile device has changed to a different location, the first set of activities may be updated to include activities associated with the different location and/or the direction of travel of the mobile device.

At 406, a second set of activities may be determined based, at least in part, on the first set of activities identified at 404 and/or other available device data. The second set of activities may include one or more likely and/or predicted future activities of a user of the mobile device such as, for example, visiting a particular location. Like the first set of activities, the second set of activities may comprise a single activity or a plurality of activities. The second set of activities may be determined in a variety of ways, including using any of the methods described above in connection with determining the first set of activities (e.g., directly from available device data and/or the first set of activities and/or based on one or more inferences derived from available device data and/or the first set of activities).

As an example, if an identified first activity comprises travelling along a freeway in a vehicle in a particular direction (e.g., based on device data indicating the mobile device is traveling at a particular speed along a particular geographical path), one or more activities of the second set of activities may be associated with a likely destination of the user in the direction of travel. For example, based on user interest information included in available device data, it may be inferred that the user has an interest in portrait art. Using available geographic and/or point-of-interest mapping information, it may be determined that a portrait art gallery is located in the direction of travel of the user associated with the identified first activity. Accordingly, visiting the portrait art gallery may be included in the set of second activities determined at 406, as the portrait art gallery may be a likely destination of the user.

In some embodiments, historical patterns and/or trends may be identified from collected device data and may be used in connection with determining the first and/or second sets of activities. For example, if historical device data indicates that a user spends a significant amount of time on a regular basis at a particular location during the evening, the location may be inferred to be a location of the user's residence. Similarly, if a user listens to a particular song frequently with an associated mobile device, a user's interest in the artist, musical genre, and/or particular song may be inferred. In certain embodiments, identifying historical patterns and/or trends in collected device data for use in connection with the systems and methods disclosed herein may allow for improved activity recognition and/or prediction.

Certain embodiments disclosed herein may facilitate provision of one or more personalized services to a mobile device and/or a user thereof based, at least in part, on available device data and/or one or more identified first or second sets of activities. For example, targeted advertising and/or offer-based services may be provided to a user of a mobile device. As discussed above, the first set of activities may be associated with activities a user is currently engaged in and the second set of activities may be associated with one or more likely future activities. Based on such information, targeted services may be delivered to a user based on the user's current and/or future activity. By delivering targeted services at a time the user is more likely to utilize or benefit from the services, such services may provide enhanced value to the user. For example, advertisements and/or offers may be delivered to a user at a time that is more likely to generate a positive advertisement impression in the user and/or a time when the user is more likely to use an offer delivered to the user's mobile device, thereby improving the value of such services.

Figure 5:
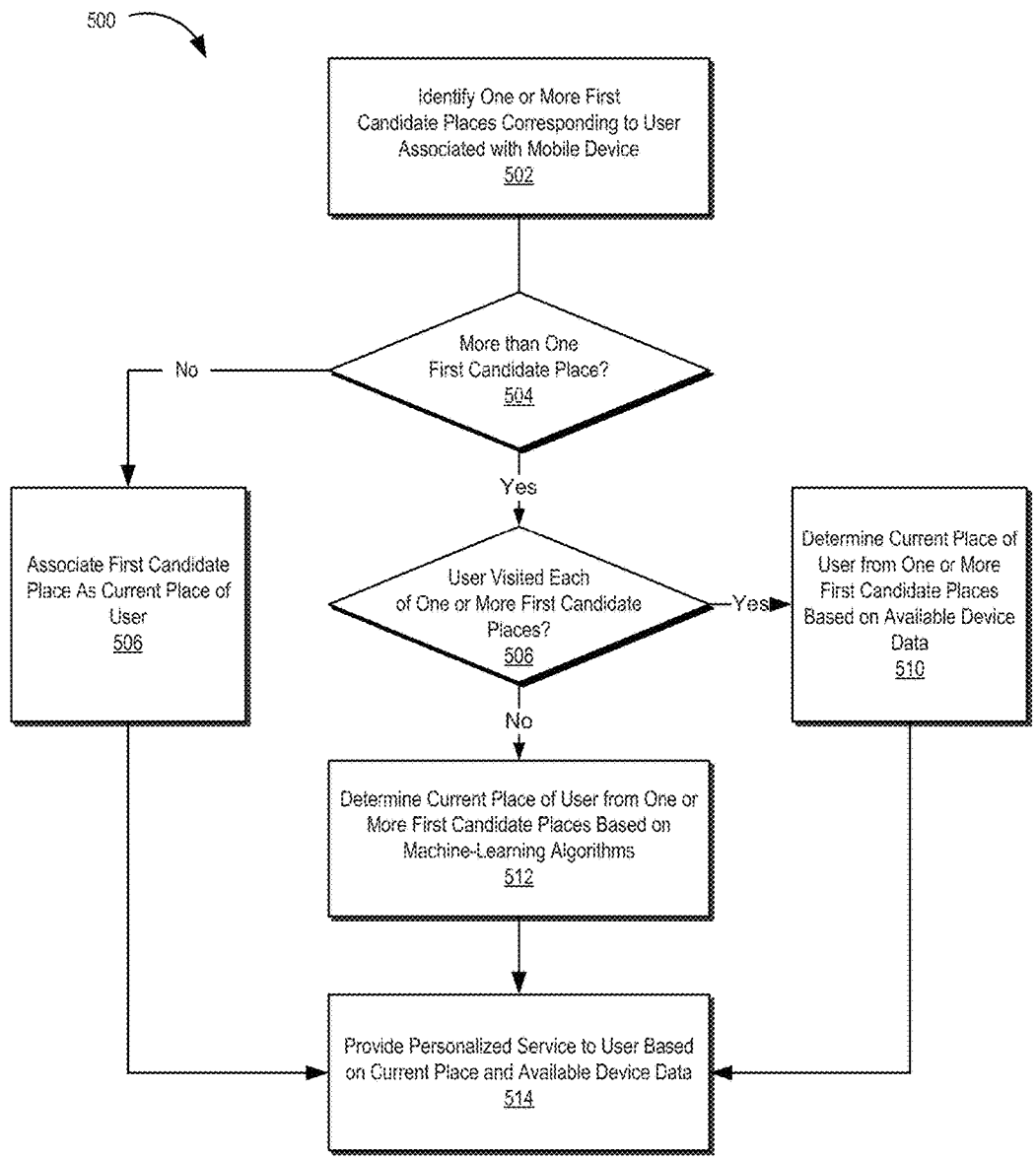
FIG. 5 illustrates a flow chart of an exemplary method of determining a place associated with a user consistent with embodiments of the present disclosure.

FIG. 5 illustrates a flow chart of an exemplary method 500 of determining a place associated with a user consistent with embodiments of the present disclosure. In certain embodiments, the illustrated method 500 and/or its constituent steps may be performed by a mobile device associated with a user, an activity recognition system, and/or any other suitable system or combination of systems. In certain embodiments, the method 500 may be utilized to determine a specific place, location, and/or point-of-interest associated with a user when available location-based device data may be associated with a plurality of places, locations, and/or points-of-interest due to a relatively lower resolution of the available location-based device data.

At 502, one or more first candidate places (e.g., points-of-interest or the like) may be identified based on available locational-based device data. For example, available location-based device data may comprise GPS location data having an associated accuracy resolution. A place database service or similar service associating places with locations (e.g., mapping or navigation services providers) may be used in conjunction with the GPS location data to identify one or more places associated with the GPS location data. If the GPS location data has relatively high resolution or accuracy, a single candidate place may be identified as being associated with the GPS location data. In certain circumstances, however, the GPS location data may have relatively low resolution or accuracy and/or places may be located relatively densely within a particular area associated with the GPS location data. Accordingly, a plurality of places may be identified as being associated with the GPS location data.

At 504, a determination may be made whether the candidate places identified at 502 comprise more than one candidate place. If only one candidate place is identified, the method may proceed to 506 where the candidate place may be identified as a current and/or actual place of a user. Based on the current and/or actual place of the user, one or more personalized services may be provided to the user at 514 as discussed in more detail below.

If more than one candidate place is identified (e.g., based on a resolution accuracy of a location-based sensor being relatively low and/or places being relatively densely located), the method 500 may proceed to 508. At 508, a determination may be made whether the user has previously visited one or more of the first candidate places. Prior visits to the one or more first candidate places may be indicative of subsequent and/or future visits to the one or more first candidate places. In certain embodiments, historical location-based device data and/or other available device data may be utilized to determine whether the user has previously visited one or more of the first candidate places. For example, device data associated with a user's schedule (e.g., device data utilized in connection with a calendaring application or the like) may show one or more past visits to one or more of the first candidate places.

If the user has previously visited one or more of the first candidate places, a likely current place the user is visiting may be identified from the one or more first candidate places based on available device data at 510. For example, if the user has visited only one of the first candidate places previously, the place may be determined to be the likely place the user is currently visiting. If the user has visited a plurality of the first candidate places previously, additional device data may be utilized to determine the likely place the user is currently visiting. For example, if historical device data indicates that a user has visited a restaurant included in the first candidate places regularly in the past and has visited a dance club included in the first candidate places only once, it may be determined that the user is more likely to currently be at the restaurant (e.g., based on a probabilistic determination that the user is more likely to be at the restaurant than the dance club). Similarly, if device data relating to ambient conditions proximate to a mobile device associated with the user are more closely associated with a restaurant than a dance club (e.g., relatively quiet, less-movement, and/or the like), it may be determined that the user is more likely to currently be at the restaurant. Based on the likely current location of the user determined at 510, one or more personalized services may be provided to the user at 514.

If the user has not previously visited the one or more first candidate places, a likely current place the user is visiting may be identified from the one or more first candidate places based on available device data at 512 using one or more suitable machine-learning algorithms. In certain embodiments, the one or more machine-learning algorithms may employ a probabilistic method to determine a likely current place the user is visiting of the first candidate places based on available device data. For example, if available device data includes information reflecting a user's interest in music and at least one place of the first candidate places includes a music store, the machine-learning algorithm may determine the music store has the highest probability of being the likely current location of the user (i.e., by being a location most closely related to user interests reflected in the device data).

At 514, one or more personalized services may be provided to a user based on the identified place the user is likely currently located. For example, targeted advertising and/or offer-based services relating to the identified likely place the user is located may be provided to the user. Delivering such targeted services while the user is at a particular place may increase the value of such services to the user and/or service providers.

Although described in connection with determining a likely current location of a user, similar methods may be utilized in connection with determining and/or predicting a likely future location of the user. For example, probabilistic determinations and/or machine-learning algorithms utilizing available device data relating to a user may be utilized in connection with predicting a likely future location of the user at a particular time. By anticipating user behavior using such methods, personalized services may be delivered to the user more effectively.

Figure 6:
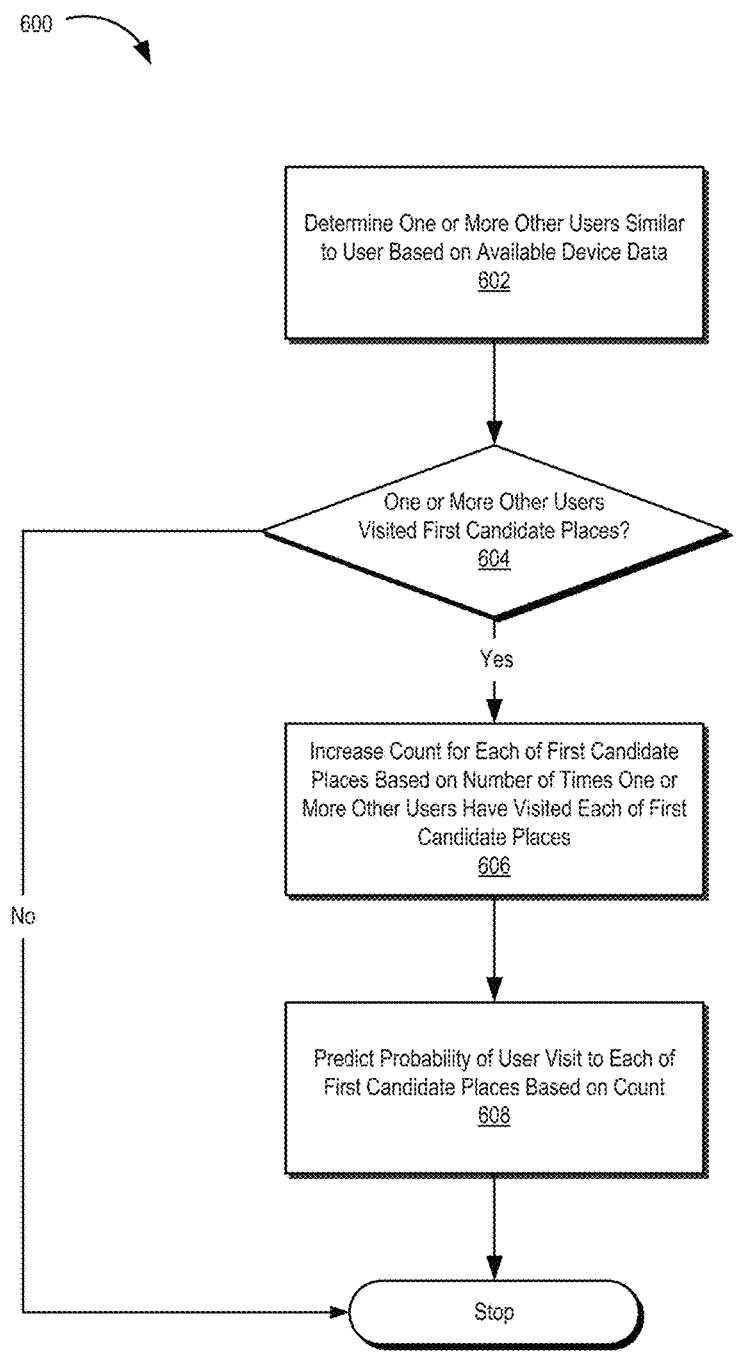
FIG. 6 illustrates a flow chart of another exemplary method of determining a place associated with a user consistent with embodiments of the present disclosure.

FIG. 6 illustrates a flow chart of another exemplary method 600 of determining a place associated with a user consistent with embodiments of the present disclosure. In certain embodiments, the illustrated method 600 and/or its constituent steps may be performed by a mobile device associated with a user, an activity recognition system, and/or any other suitable system or combination of systems. In some embodiments, the method 600 may be utilized to determine a specific place, location, and/or point-of-interest associated with a user based, at least in part, on information collected from one or more other users. By utilizing information associated with other similar users, determination of a specific place of a user (e.g., location or point-of-interest) may be improved, especially if relatively limited information and/or device data is available relating to the user.

At 602, one or more other users similar to a user of a mobile device may be identified. The one or more other similar users may be identified in a variety of ways. For example, the one or more other users may be identified as having similar interests and/or user profile information based on available device data. In some embodiments, the one or more other similar users may be identified based on having previously visited similar places to the user, having similar spatial and/or temporal historical travel patterns, having similar content viewing and/or browsing histories, and/or the like. In further embodiments, similar users may be identified through contacts and/or other social connections of a user (e.g., social connections derived from device data associated with social networking services the user interacts with or the like). In certain embodiments, the one or more other similar users may be identified based on Jaccard similarly coefficients.

At 604, a determination may be made whether the one or more other users identified at 602 have visited one or more first candidate places. The one or more first candidate places (e.g., points-of-interest or the like) may be identified based on available location-based device data associated with a user of the mobile device. In certain embodiments, the determination at 604 may utilize available historical device data (e.g., location-based device data) associated with the one or more other users to determine whether the users have visited any of the one or more first candidate places.

If the one or more other users identified at 602 have not visited the one or more first candidate places, the method 600 may end. In such circumstances, other device data associated with a user may be utilized to identify a likely place from one or more candidate places using, for example, probabilistic determinations, contextual information inference techniques, machine-learning algorithms, and/or the like. In certain embodiments, device data associated with the other similar users identified at 602 (e.g., interest information and/or the like) may also be utilized in connection with identifying a likely place from one or more candidate places.

If the one or more other users identified at 602 have visited the one or more first candidate places, the method may proceed to 606. At 606, counts may be obtained for each of the first candidate places based on a number of times the one or more other similar users identified at 602 have visited the first candidate places. For example, if the first candidate places include a first place and a second place, and the one or more other users have visited the first place ten times and the second place two times, the first place may be associated with a count of ten and the second place with a count of two. Using such count information, probabilistic determinations of a likely place of a user from the first candidate place may be performed at 608. In the above example, the determination may result in the first place being identified as the likely location of the user given it is more frequented by other similar users. In some embodiments, a variety of other device data related to the user and/or other similar users may be utilized in connection with the determination at 608. Based on the likely current location of the user determined at 608, one or more personalized services may be provided to the user relating to the likely current location.

It will be appreciated that similar methods to the illustrated method 600 may be utilized in connection with determining and/or predicting a likely future location of the user. For example, probabilistic determinations and/or machine-learning algorithms utilizing information associated with other similar users may be utilized in connection with predicting a likely future location of the user at a particular time. Moreover, in certain embodiments, a plurality of machine-learning techniques and/or probabilistic determinations may be utilized to determine a likely current and/or future of a user. In some embodiments, weights may be assigned to each technique and/or determination used, and a determination of a likely current and/or future location of the user may be based, at least in part, on such weights (e.g., based on a weighted average of relative weights of the utilized techniques and/or determinations).

Figure 7:
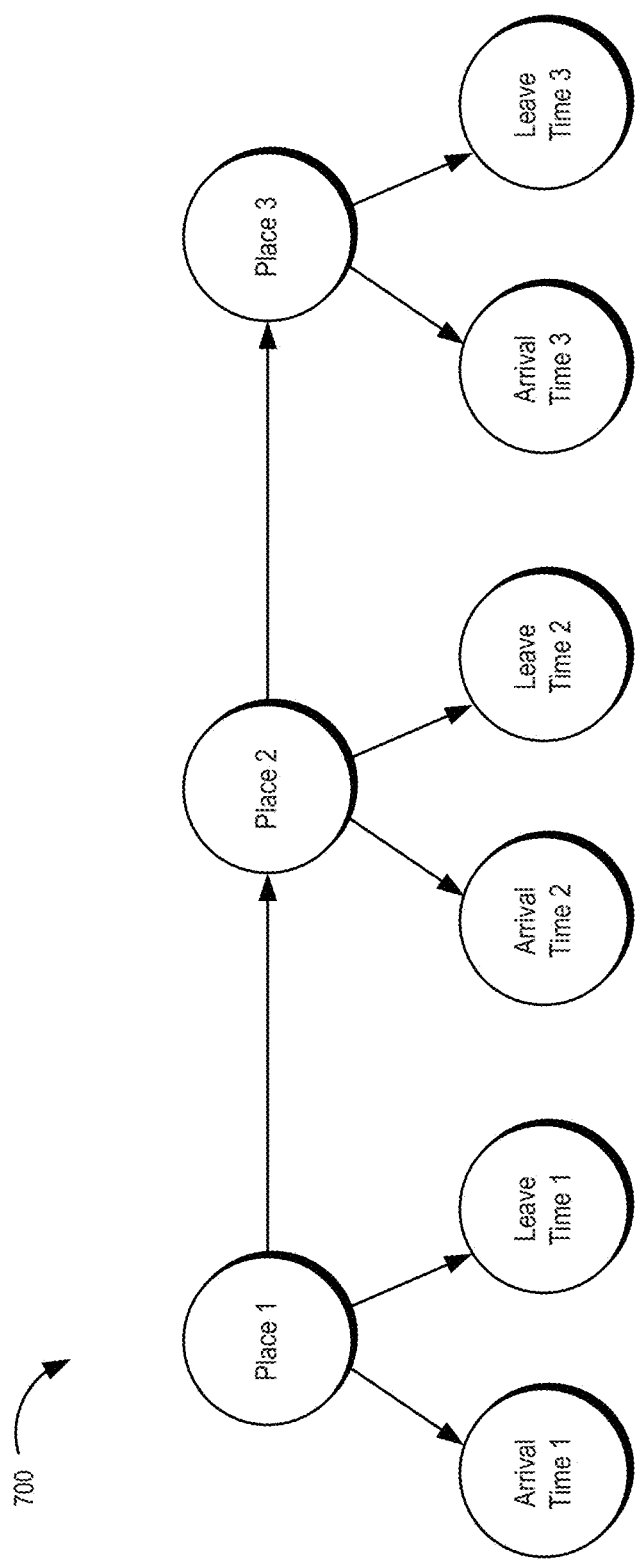
FIG. 7 illustrates a conceptual diagram of a hidden Markov model utilized in connection with predicting a future location of a user consistent with embodiments of the present disclosure.

FIG. 7 illustrates a conceptual diagram 700 of a hidden Markov model utilized in connection with predicting a future location of a user consistent with embodiments of the present disclosure. In certain embodiments, predicting a likely future location of a user may be based, at least in part, on a current location of the user. That is, a user's current location may play a potentially decisive role in predicting their next location. Users may also have particular movement patterns at particular times throughout the day. Such user behaviors may be utilized in connection with the systems and methods disclosed herein to predict a likely future location of the user.

A statistical Markov model may be utilized in connection with determining and/or predicting a likely future location of a user. For example, a hidden Markov model such as the illustrated model may be utilized. In some embodiments, places may be modeled as latent variables having associated observed variables. Observed variables may include, for example, candidate places, geographical location information, and/or arrival/leave times at the one or more places. In some embodiments, a data structure based on a Markov process may be provided including a transitional matrix reflecting one or more places and user behavior patterns (e.g., arrival/leave times from the one or more places). Rows of the matrix may indicate a probability distribution of transitions from a particular place to others.

As discussed above, in some embodiments, places may be modeled as latent variables in the hidden Markov model. For a particular place, arrival and leave times (e.g., average historical arrival and leave times) by a user at the place may be observed and utilized as observed variables in the hidden Markov model. In some embodiments, to predict a next place the user will visit, the following equation may be utilized:

$$Pr(l_t|l_{t-1}, arr_{t-1}, leave_{t-1}) = Pr(l_t|l_{t-1}) \times Pr(arr_{t-1}|l_{t-1}) \times Pr(leave_{t-1}|l_{t-1})$$

Equation 1

That is, the probability of a next location or place ($l_t$) being a next destination of the user may depend on probabilities associated with the prior location or place ($l_{t-1}$), observed arrival times associated with the prior location or place ($arr_{t-1}$), and observed departure/leave times associated with the prior location or place ($leave_{t-1}$).

In certain embodiments, once a particular place is predicted as a next likely destination of a user, it may also be valuable to predict an estimated arrival time at the next destination. With such information, for example, personalized services (e.g., targeted advertisements) may be delivered to a user at both a time and/or location that the services are more likely to be valuable to the user. In certain embodiments, a predicted arrival time at a next destination may be determined by Equation 2 below:

$$\mathrm{argmax}_{arr_{t2}} Pr(arr_{t2}|l_{t2})$$

Equation 2

If an observed departure/leave time at the prior location or place ($l_{t-1}$) is unavailable (e.g., due to location-based sensors not being active at a time of departure or the like), a joint conditional probability distribution of a next location or place and a leave time at the prior location may be predicted according to Equation 3:

$$Pr(l_t, \text{leave}_{t-1} | l_{t-1}, arr_{t-1}) = Pr(l_t | l_{t-1}, arr_{t-1}) \times Pr(\text{leave}_{t-1} | l_{t-1}, arr_{t-1})$$ Equation 3

That is, the joint conditional probability of the next location or place and the leave time at the prior location may depend on probabilities associated with the prior location or place ($l_{t-1}$) and observed arrival times associated with the prior location or place ($arr_{t-1}$).

In some circumstances, it may be determined that the conditional independence assumptions used in Equation 1 and Equation 3 are too strong. Often, a leave time at a prior place may have a strong correlation with a next place. For example, if a leave time from a work location is approximately noon, the next place the user will visit is likely to be a lunch/restaurant location. Equation 3, however, may rank a user's home higher than the lunch/restaurant location as a likely next place. Accordingly, in some embodiments, the hidden Markov model may be modified to factor in leave time and next place locations.

Figure 8:
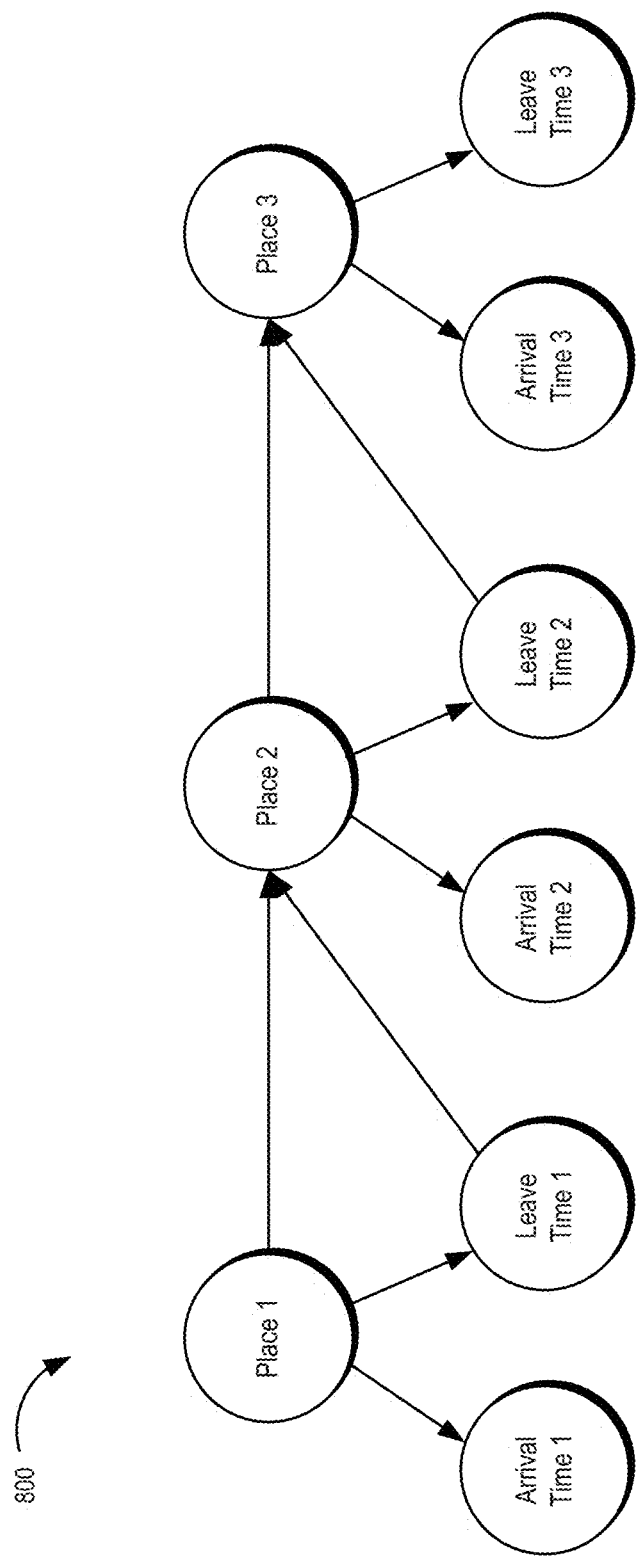
FIG. 8 illustrates conceptual diagram of a modified hidden Markov model utilized in connection with predicting a future location of a user consistent with embodiments of the present disclosure.

FIG. 8 illustrates a conceptual diagram 800 of a modified hidden Markov model utilized in connection with predicting a future location of a user consistent with embodiments of the present disclosure. In the modified model, the conditional independent assumption may no longer be considered valid for leave/departure times at a prior place and a next place. Accordingly, as reflected below in Equation 4, the prediction of a next place and a leave time from a prior place may be provided as a function of the prior place and an arrival time at the prior place.

$$Pr(l_t, \text{leave}_{t-1} | l_{t-1}, arr_{t-1}) = f(l_t, \text{leave}_{t-1}, l_{t-1}, arr_{t-1})$$ Equation 4

In some embodiments, to perform reasonable predictions of a next place and a departure/leave time based on Equation 3, a current place may be associated with a future place based on one or more time constructions. A place may be represented as a random variable in a 2D plane. The 2D plane may be partitioned with relatively high granularity (e.g., a 100m bounding rectangle), which can be used to represent a domain of a place random variable (l). Time may be considered a continuous dimension having increasing order. Accordingly, a set of temporal-related random variables may be constructed that are defined in domains where repeat visits to a place are possible. For example, in some embodiments, two time-domain definitions may be used: (i) an hour of a day: 24 values, each representing an hour; and/or (ii) a day of the week: 7 values, each representing a day. It will be appreciated that other time-domain definitions may also be used in connection with the disclosed systems and methods (e.g., holidays, months, minutes, seconds, etc.).

Using the exemplary time-domain definitions provided above, two random variables may be defined: h for hours and d for days. Using these variables, Equation 4 may be rewritten as follows:

$$Pr(l_t, \text{leave}_{t-1} | l_{t-1}, arr_{t-1}) = \frac{f(l_t, d_t, h_t, l_{t-1}, d_{t-1}, h_{t-1})}{f(l_{t-1}, d_{t-1}, h_{t-1})}$$ Equation 5

In some embodiments, Equation 5 may be utilized to evaluate a distribution of a next likely place. The function $f(l_t, d_t, h_t, d_{t-1}, h_{t-1})$ may represent a historical count of arriving at a place at t−1 and leaving for a next place at t, and may be used to model transitional behaviors between two places.

Figure 9:
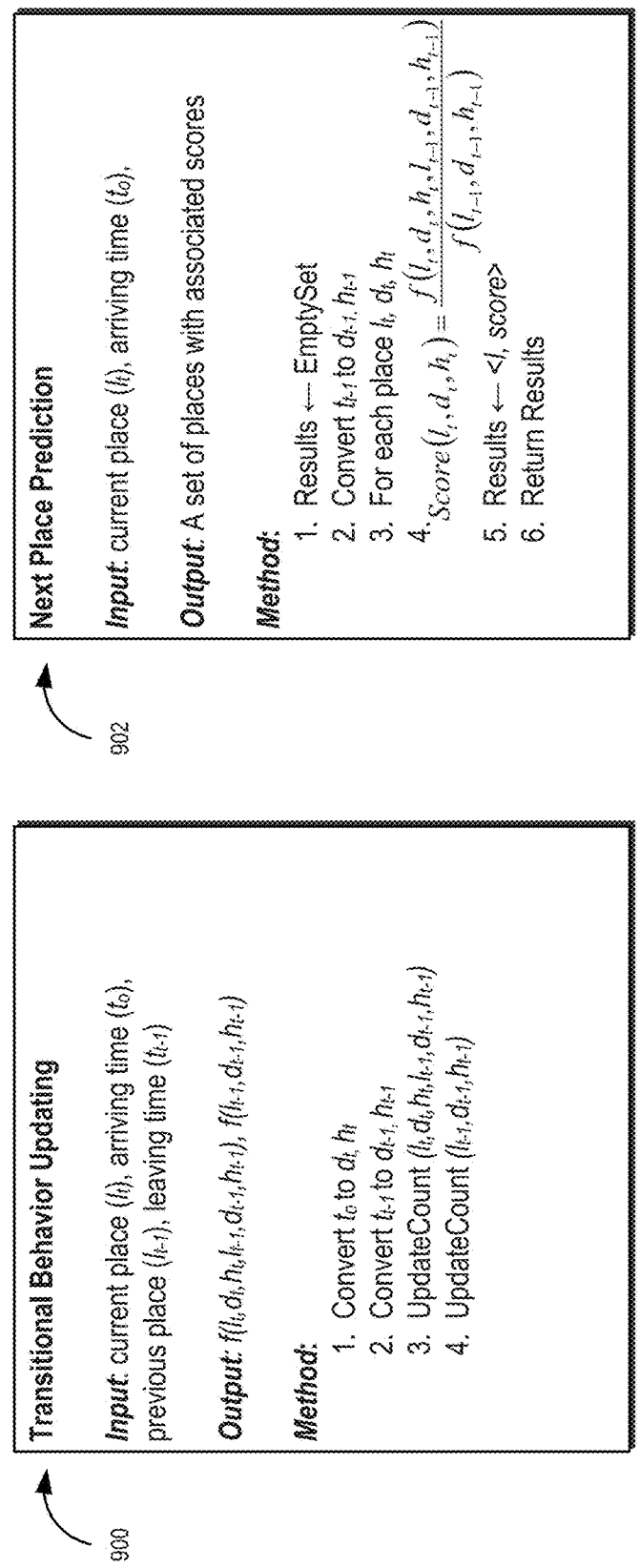
FIG. 9 shows exemplary algorithmic methods and associated inputs and/or outputs for transitional behavior updating and next place prediction consistent with embodiments disclosed herein.

FIG. 9 shows exemplary algorithmic methods and associated inputs and/or outputs for transitional behavior updating 900 and next place prediction 902 consistent with embodiments disclosed herein. In certain embodiments, the algorithmic methods 900, 902 may be utilized in connection with implementing certain features of location prediction methods using the techniques described above. It will be appreciated that the illustrated algorithmic methods and associated inputs and/or outputs 900, 902 are merely exemplary, and that other suitable algorithms having a variety of other inputs and/or outputs may be utilized to implement the systems and methods disclosed herein.

Figure 10:
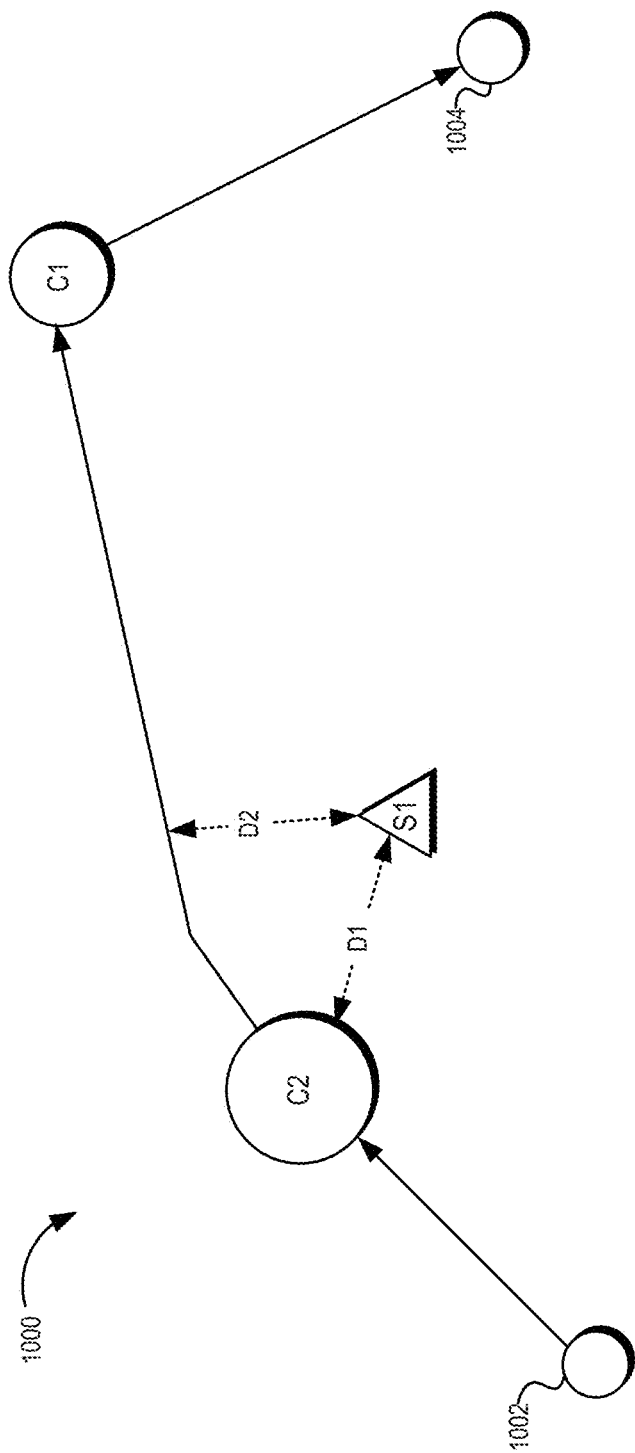
FIG. 10 illustrates a conceptual diagram of geographical targeting methods consistent with embodiments of the present disclosure.

FIG. 10 illustrates a conceptual diagram 1000 of geographical targeting methods consistent with embodiments of the present disclosure. In certain embodiments, geographical targeting methods may be utilized in connection with provision of one or more personalized and/or targeted services to a user of a mobile device (e.g., targeted advertising services or the like). For example, from an advertiser's perspective, advertisements delivered to a consumer should ideally be well-matched to the interests of the consumer at a time and/or location that the consumer is likely to purchase advertised goods and/or services. Identifying and/or predicting geographical activities of a user may thus allow for more effective targeting of advertisements to the user.

Certain embodiments disclosed herein may provide for precise geographical targeting based on historical user travel patterns and/or paths as well as a variety of other available data relating to the user (e.g., device data collected by a mobile device associated with the user). In certain embodiments, geographical targeting methods disclosed herein may utilize a scoring model to estimate a relevancy of a particular user to a targeting entity on a geographic basis (e.g., an advertising store or the like). In some embodiments, the methods may utilize a variety of location-based device data and/or other information relating to a user including, for example, historical visits to one or more places and visit durations, times of visits to places, user modes of travel (e.g., walking, biking, driving, flying, etc.), user travel paths, distances between targeting entities and locations visited by the user and/or travel paths, various weighting factors related to preferences of a targeting entity, and/or any other suitable type of data.

As illustrated in the diagram 1000 of FIG. 10, a user may travel along a path (e.g., a predicted path) between points 1002 and 1004. Along the path, one or more location clusters C1, C2 may exist associated with one or more places that the user has visited and/or visits on a frequent basis. The location clusters C1, C2 may be likely stops that the user will make along the path. In the illustrated diagram, the relative sizes of points 1002, 1004, and clusters C1, C2 may be associated with historical visit frequency and duration of the locations.

A targeting entity S1 (e.g., an advertising store or the like) may have an interest in delivering one or more targeted services to the user at a particular point along the path and/or time. For example, a targeting entity may wish to deliver a targeted advertisement to the user at a time they are likely to travel most closely to the targeting entity. In the diagram, D1 represents the distance between the targeting entity S1 and location cluster C2 and D2 represents the shortest distance between the targeting entity S1 and the predicted travel path of the user.

A score for an association between a particular user and targeting entity may be determined. In certain embodiments, this score may be associated with a relative degree of association between targeting preferences of the targeting entity and user interests included in and/or derived from available device data. Targeted preferences may be adjusted by targeting entities so as to target specific users and/or groups of users. Generally speaking, the score may be an indication as to a relevancy between a user and a targeting entity. A targeting entity comprising a store may utilize such scoring to select a list of users having interests associated with the store's target customer base (e.g., based on selecting users having a threshold relevancy or the like). In another example, a targeting entity comprising a retail chain may aggregate scores between multiple associated locations of the chain to generate a final score for a user. In yet further embodiments, a targeting entity comprising a point-of-interest recommendation service provider may calculate scores between a user and one or more points-of-interest in connection with its services.

In certain embodiments, a score describing a relevancy between a user and a targeting entity may have at least two associated components. A first score component may be based on a relative distance between targeting entities and location clusters. A second score component may be based on the relative distance between targeting entities and travel paths.

In certain embodiments, a first component for computing a score based on a relative distance between a targeting entity and a location cluster may be described according to the following:

$$S_1 = W_1 \cdot \Sigma_i \ln(d_i) \cdot F_1(t_i, S) \cdot e^{-D1/R(V,S)} \cdot e^{-t_i/(S)} \quad \text{Equation 6}$$

In Equation 6, i may represent an ith visit to a location. $d_i$ may represent a duration of a stay for the ith visit to the location. A logarithmic function may be utilized as, in certain circumstances, a duration of a stay at a location may be less important that the frequency of visits to the location. $F_1$ may be a function that provides a weighting factor based on a time of a visit and a store type S of a visit. For example, a coffee shop may be equally weighted every day of the week whereas a grocery store may be weighted towards weekend visits. $D_1$ may be a distance between a targeting entity and a visited location.

R(V,S) may be a range factor that depends on a targeting entity and a mode of travel (e.g., walking, biking, driving, flying, etc.). For example, a coffee shop may have a range factor corresponding to a range of 200 m, whereas a large shopping center may have a range factor corresponding to a range of 0.5 miles. The range factor may also depend on the mode of travel. For example, walking may have a range factor corresponding to a range of 100-200 m, whereas driving may have a range factor corresponding to a range of 1-2 km. In certain embodiments, a mode of travel may be determined based on a distance between two consecutive location-based measurement data points and a time between measurement of the two data points.

A user's behavior patterns may change over time. Accordingly, a time delay factor T(S) may be included in Equation 6 that allows more recent events to have higher relevance than less recent events. In certain embodiments, the time delay factor may depend on the type of targeting entity. A weighting factor $W_1$ may be utilized to adjust relative importances among different scoring components.

In certain embodiments, a second score component for computing a score based on a relative distance between a targeting entity and a travel path may be described according to the following:

$$S_2 = W_2 \cdot \Sigma_i \ln(d_i) \cdot F_2(t_i, S) \cdot e^{-D2/R(V,S)} \cdot e^{-t_i/T(S)} \quad \text{Equation 7}$$

As can be seen, many of the variables included in Equation 7 may be similar to the variables of Equation 6 detailed above. Similar to $F_1$, $F_2$ may be a function that provides a weighting factor based on a time of a travel and a store type S. $D_2$ may be a distance between a targeting entity and a travel path. A weighting factor $W_1$ may be utilized to adjust relative importances among different scoring components.

In some embodiments, parameters of the scoring model may be adjusted based on targeting entity preferences. In addition, various suitable machine-learning algorithms may be utilized to adjust parameters based on user feedback information (e.g., click through rates, advertisement conversion rates, etc.). The scoring model may also be simplified when desired. For example, certain parameters (e.g., $F_1$), may be omitted if deemed less important for specific targeting activities.

A scoring methodology utilizing the components detailed above may be utilized to match users with targeting entities based on the user's location-based behaviors. Targeting entities may then deliver personalized services (e.g., targeted advertisements) to well-matched users at a time and/or location that the user is more likely to utilize such services.

Figure 11:
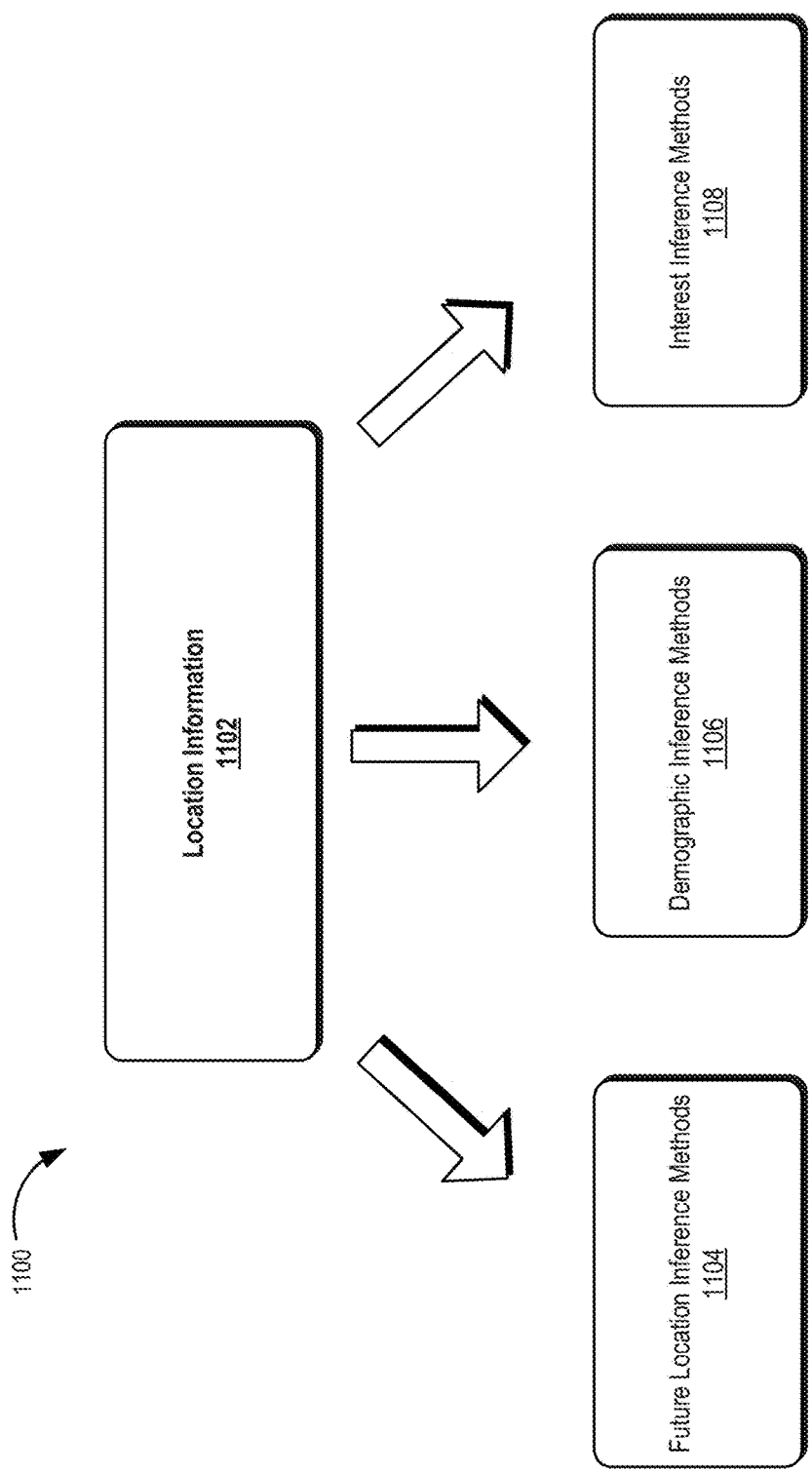
FIG. 11 illustrates a block diagram of a location-based inference architecture consistent with embodiments disclosed herein.

FIG. 11 illustrates a block diagram of a location-based inference architecture 1100 consistent with embodiments disclosed herein. The activity recognition and prediction methods and personalized services targeting methods disclosed herein may utilize various location-based information 1102 and other data associated with a user (e.g., device data collected by a mobile device) in connection with matching a user to services and delivering the services at targeted locations and/or times. In this context, various future location inference methods 1104, demographics inference methods 1106, and interest inferences methods 1108 may be utilized. Future location inference methods 1104 may include, for example, methods employing hidden Markov statistical modeling to predict likely locations a user will visit in the future. Demographic interference methods 1106 may utilize a variety of prediction models to determine, based on the location information 1102, various demographic information including, for example, gender, age, income level, marital status, and/or the like. Interest inferences methods 1108 may utilize a variety of prediction models to determine, based on the location information 1102, various user interest information including, for example, dining interests, shopping interests, vacation interests, driving interests, and/or the like.

Figure 12:
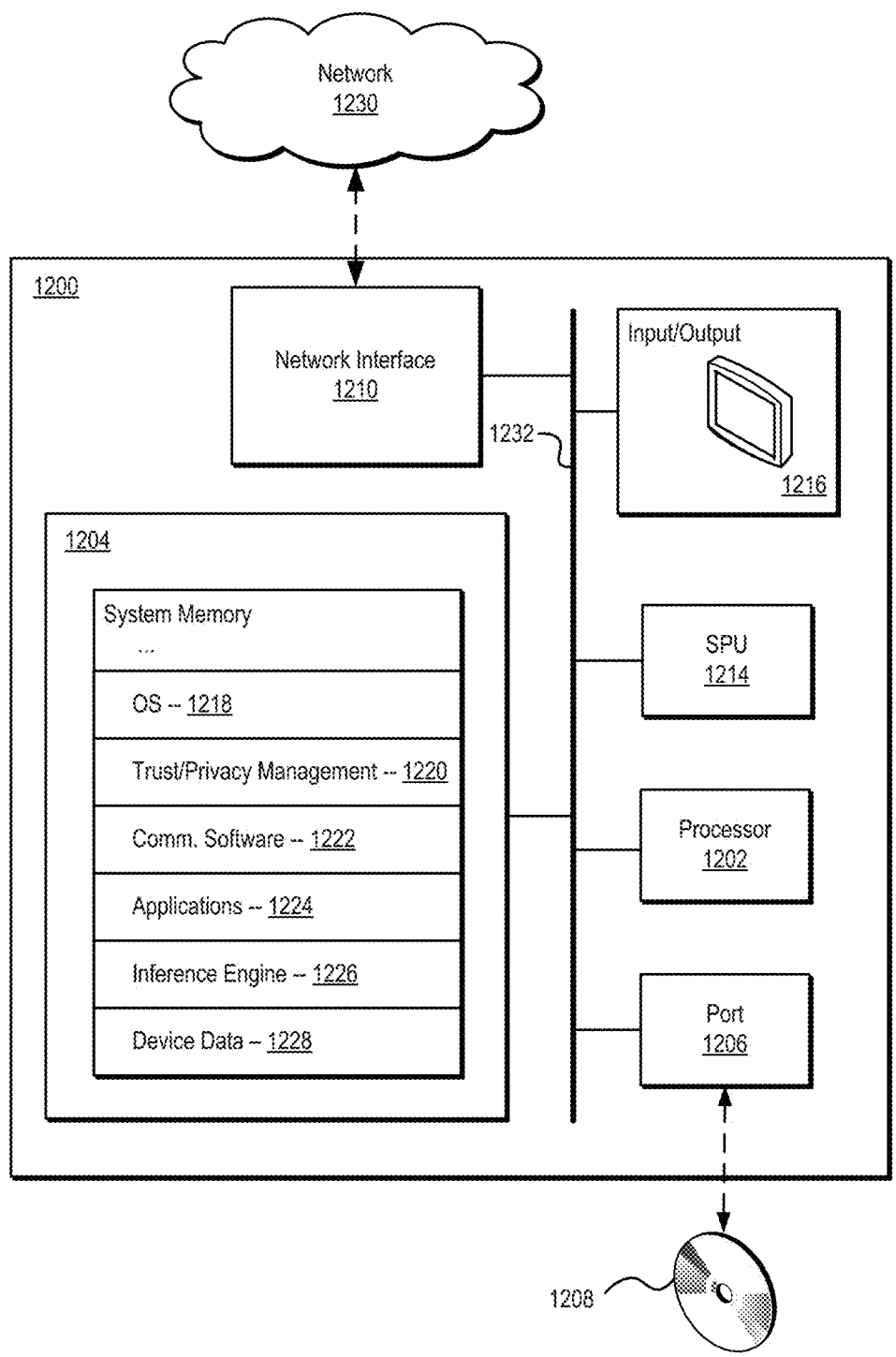
FIG. 12 illustrates an exemplary system that may be used to implement embodiments of the systems and methods disclosed herein.

FIG. 12 illustrates an exemplary system 1200 that may be used to implement embodiments of the systems and methods disclosed herein. The exemplary system 1200 may comprise a mobile device, an activity recognition and/or prediction system, a service provider system, and/or any other system configured to implement embodiments of the systems and methods disclosed herein. As illustrated in FIG. 12, the system 1200 may include: a processing unit 1202; system memory 1204, which may include high speed random access memory ("RAM"), non-volatile memory ("ROM"), and/or one or more bulk non-volatile computer-readable storage mediums (e.g., a hard disk, flash memory, etc.) for storing programs and other data for use and execution by the processing unit 1202; a port 1206 for interfacing with removable memory 1208 that may include one or more diskettes, optical storage mediums (e.g., flash memory, thumb drives, USB dongles, compact discs, DVDs, etc.) and/or other non-transitory computer-readable storage mediums; a network interface 1210 for communicating with other systems via one or more network connections 1230, and the like using one or more communication technologies; a user interface 1216 that may include a display and/or one or more input/output devices such as, for example, a touchscreen, a keyboard, a mouse, a track pad, and the like; and one or more busses 1232 for communicatively coupling the elements of the system 1200. In certain embodiments, the system 1200 may include and/or be associated with one or more sensors (not shown) configured to collect various device data, including any of the types of sensors disclosed herein.

In some embodiments, the system 1200 may, alternatively or in addition, include a secure processing unit ("SPU") 1214 that is protected from tampering by a user of system 1200 or other entities by utilizing secure physical and/or virtual security techniques. An SPU 1214 can help enhance the security of sensitive operations such as personal information management, trusted credential and/or key management, privacy and policy management, and other aspects of the systems and methods disclosed herein. In certain embodiments, the SPU 1214 may operate in a logically secure processing domain and be configured to protect and operate on secret information, as described herein. In some embodiments, the SPU 1214 may include internal memory storing executable instructions or programs configured to enable to the SPU 1214 to perform secure operations, as described herein.

The operation of the system 1200 may be generally controlled by a processing unit 1202 and/or a SPU 1214 operating by executing software instructions and programs stored in the system memory 1204 (and/or other computer-readable media, such as removable memory 1208). The system memory 1204 may store a variety of executable programs or modules for controlling the operation of the system 1200. For example, the system memory 1204 may include an operating system ("OS") 1218 that may manage and coordinate, at least in part, system hardware resources and provide for common services for execution of various applications and a trust and privacy management system 1220 for implementing trust and privacy management functionality including protection and/or management of personal information. The system memory 1204 may further include, without limitation, communication software 1222 configured to enable in part communication with and by the system 1200, applications 1224 (e.g., media applications), an inference engine 1226 configured to implement certain activity and/or location recognition and/or targeted services methods disclosed herein, device data 1228, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method of providing a targeted service to a mobile device associated with a user, the method performed by a system comprising a processor and a non-transitory computer-readable storage medium storing instructions that, when executed by the processor, cause the system to perform the method, the method comprising:
    receiving, at an interface of the system, device data from the mobile device;
    identifying one or more first locations associated with the user based on the device data;
    identifying at least one departure time of the user from the one or more first locations based on the device data;
    identifying one or more second locations based on the one or more first locations and the at least one departure time from the one or more first locations, wherein identifying the one or more second locations comprises modeling a probability of one or more candidate locations being visited by the user after the one or more first locations based, at least in part, on the at least one departure time and selecting the one or more second locations from the one or more candidate locations based on a relative probability associated with the one or more second locations;
    determining one or more scores associated with one or more candidate entities based, at least in part, on the one or more second locations and the at least one departure time from the one or more first locations;
    identifying at least one targeting entity from the one or more candidate entities based on the one or more scores; and
    transmitting, from the interface, content information associated with the at least one targeting entity to the user of the mobile device.

2. The method of claim 1, wherein the one or more first locations comprise at least one location cluster.

3. The method of claim 1, wherein the one or more second locations comprise at least one location cluster.

4. The method of claim 1, wherein the content information comprises at least one advertisement associated with the targeting entity.

5. The method of claim 1, wherein one or more scores are further based, at least in part, on a frequency of prior visits to the one or more second locations by the user.

6. The method of claim 1, wherein the one or more scores are further based, at least in part, on a number of prior visits to the one or more second locations by the user.

7. The method of claim 1, wherein the one or more scores are further based, at least in part, on a duration of prior visits to the one or more second locations by the user.

8. The method of claim 1, wherein the one or more scores are further based, at least in part, on a mode of travel the user.

9. The method of claim 1, wherein the device data comprises data obtained by one or more sensors of the mobile device.

10. The method of claim 1, wherein the device data comprises location information of the mobile device.

11. The method of claim 1, wherein the device data comprises data generated based on user interaction with the mobile device.

12. The method of claim 1, wherein the device data comprises spatial historical travel patterns of the user of the mobile device.

13. The method of claim 1, wherein the device data comprises temporal historical travel patterns of the user of the device.

14. The method of claim 1, wherein identifying the one or more second locations further comprises determining that the one or more second locations are associated with a relative probability exceeding a threshold.

15. The method of claim 1, wherein the probability of the one or more candidate locations being visited by the user after the one or more first locations is modeled using a hidden Markov model.

16. The method of claim 1, wherein modeling the probability of the one or more candidate locations being visited by the user after the one or more first locations is based on historical device data collected by the mobile device.

17. The method of claim 1, wherein the method further comprises:
 estimating one or more arrival times at the one or more second locations based on the one or more first locations and the at least one departure time from the one or more first locations.

18. The method of claim 17, wherein determining the one or more scores associated with the one or more candidate entities is further based, at least in part, on the one or arrival times at the one or more second locations.

\* \* \* \* \*

UNITED STATES PATENT AND TRADEMARK OFFICE
CERTIFICATE OF CORRECTION

PATENT NO.        : 10,200,822 B2
APPLICATION NO.   : 15/976136
DATED             : February 5, 2019
INVENTOR(S)       : Su et al.

Page 1 of 1

It is certified that error appears in the above-identified patent and that said Letters Patent is hereby corrected as shown below:

Claim 7, Column 29, Line 8-9, "mode of travel the user" should read as --mode of travel of the user--.

Signed and Sealed this
Eighteenth Day of June, 2019

Andrei Iancu
*Director of the United States Patent and Trademark Office*